(12) United States Patent
Guzman-Casillas et al.

(10) Patent No.: US 7,710,693 B2
(45) Date of Patent: May 4, 2010

(54) APPARATUS AND METHOD FOR PROVIDING PROTECTION FOR A SYNCHRONOUS ELECTRICAL GENERATOR IN A POWER SYSTEM

(75) Inventors: Armando Guzman-Casillas, Pullman, WA (US); Hector J. Altuve-Ferrer, Monterrey (MX)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 391 days.

(21) Appl. No.: 11/534,587

(22) Filed: Sep. 22, 2006

(65) Prior Publication Data

US 2008/0074810 A1    Mar. 27, 2008

(51) Int. Cl.
  H02H 7/06    (2006.01)
  H02H 3/00    (2006.01)
  H02P 11/00   (2006.01)
  H02P 9/00    (2006.01)
(52) U.S. Cl. .............................. 361/20; 361/80; 322/25
(58) Field of Classification Search .................. 361/20, 361/80; 322/25
  See application file for complete search history.

(56) References Cited

U.S. PATENT DOCUMENTS

| | | | | |
|---|---|---|---|---|
| 2,917,672 | A | * | 12/1959 | Tremaine ...................... 361/20 |
| 4,029,951 | A |   | 6/1977 | Berry et al. |
| 4,148,087 | A | * | 4/1979 | Phadke ......................... 361/80 |
| 4,245,182 | A |   | 1/1981 | Aotsu et al. |
| 5,264,778 | A |   | 11/1993 | Kimmel et al. |
| 5,519,300 | A | * | 5/1996 | Leon et al. ................... 318/729 |
| 5,581,470 | A |   | 12/1996 | Pawloski |
| 5,592,393 | A | * | 1/1997 | Yalla ........................... 700/293 |
| 5,805,395 | A |   | 9/1998 | Hu et al. |
| 6,294,898 | B2 |  | 9/2001 | Lawson et al. |

(Continued)

FOREIGN PATENT DOCUMENTS

WO    WO 02/39642 A2    5/2002

OTHER PUBLICATIONS

ABB Automation Inc., Substation Automation and Protection Division, Coral Springs, FL 33065; Instruction Leaflet 41-748P; Effective: Nov. 1999; Supersedes I.L. 41-748N, Dated Feb. 1984; Type KLF Loss-of-Field Relay 50/60 Hertz.

(Continued)

Primary Examiner—Fritz M. Fleming
Assistant Examiner—Lucy Thomas
(74) Attorney, Agent, or Firm—Eugene M. Cummings, P.C.

(57) ABSTRACT

An apparatus and method provide protection for a synchronous generator in a power system. The method includes deriving a plurality of generator safe operating boundary data expressions from power system data and/or user-defined inputs. The power system data may include a plurality of generator data supplied by a manufacturer of the generator and/or power system parameters such as power system equivalent impedance. Each generator safe operating boundary data expression may relate to a generator capability curve, a steady-state stability limit curve, a minimum excitation limiter curve, an over excitation limiter curve, or an user-defined curve. The method also includes calculating an active power value sum and a reactive power value sum based on generator three-phase currents and voltages, comparing these sums to at least one of the plurality of generator safe operating boundary data expressions, and to provide protection and/or alarming functions for the generator based on this comparison.

16 Claims, 14 Drawing Sheets

U.S. PATENT DOCUMENTS

| | | | |
|---|---|---|---|
| 6,492,801 B1 | 12/2002 | Sims et al. | |
| 6,525,504 B1 | 2/2003 | Nygren et al. | |
| 6,794,879 B2 | 9/2004 | Lawson et al. | |
| 6,839,207 B2 | 1/2005 | Folliot et al. | |
| 6,924,565 B2 | 8/2005 | Wilkins et al. | |
| 6,924,628 B2 * | 8/2005 | Thompson | 322/20 |
| 6,975,946 B2 * | 12/2005 | Al-Hamrani | 702/60 |
| 7,006,935 B2 * | 2/2006 | Seki | 702/64 |
| 2001/0001534 A1 | 5/2001 | Lawson et al. | |
| 2002/0128759 A1 | 9/2002 | Sodoski et al. | |
| 2005/0033481 A1 | 2/2005 | Budhraja et al. | |

OTHER PUBLICATIONS

GE Power Management, 215 Anderson Avenue, Markham, Ontario, L6E 1B3, Canada, E-Mail: info.pm@indsys.ge.com, Internet: www.GEindustrial.com/pm; Instructions, SGC 21A, 21B, 21C, Negative-Sequence Time Overcurrent Relays, Manual Part No. GEK-86069J, Copyright 2002 GE Power Management.

Power System Stability and Control by Prabha Kundur; Chapter 5: Synchronous Machine Representation in Stability Studies, Section 5.4: Reactive Capability Limits, pp. 191-196; Published Date: 1994.

Protective Relaying, Principles and Applications by J. Lewis Blackburn; Chapter 8: Generator Protection, pp. 262-267; Published Date:1997.

Power Plant "Horror Stories" by Charles J. Mozina, Beckwith Electric Co., Inc., 6190-118th Avenue North, Largo, FL 33773-3724; emozina@beckwithelectric.com.

Dynamic Simulations Help Improve Generator Protection by Ramon Sandoval from Comision Federal de Electricidad and Armando Guzman and Hector J. Altuve from Schweitzer Engineering Laboratories, Inc.

* cited by examiner

APPARATUS AND METHOD FOR PROVIDING PROTECTION FOR A SYNCHRONOUS ELECTRICAL GENERATOR IN A POWER SYSTEM

CROSS-REFERENCE TO RELATED APPLICATIONS

None

BACKGROUND OF THE INVENTION

The present invention generally relates to synchronous generators, and more specifically, to an apparatus and method for providing generator protection for a synchronous electrical generator in a power system.

Synchronous electrical generators ("synchronous generators") are used in many applications requiring alternating current (AC) power generation. For example, electric utility systems or power systems include a variety of power system elements such as synchronous generators, power transformers, power transmission lines, distribution lines, buses, capacitors, etc. to generate, transmit and distribute electrical energy to loads. A synchronous generator operates to, for example, convert mechanical rotation via a prime mover (e.g., shaft rotation provided by a coal powered steam turbine) into AC current via electromagnetic principles. After suitable conditioning, the alternating electrical current is transmitted and distributed as three-phase electric power to a variety of loads.

As is known, synchronous generator design is based on Faraday's law of electromagnetic induction and includes a rotational portion for inducing an electromotive force (EMF) in a stationary portion. The rotational portion is driven by the prime mover. More specifically, the rotational portion, or rotor, includes a field winding wrapped around a rotor body, and the stationary portion includes a stator having an armature winding. The rotor body, typically made of steel, may have a salient pole structure (i.e., poles protruding from a shaft) or a cylindrical structure.

In operation, EMFs are induced in the armature windings of the stator upon application of DC current to the field winding of the rotor. That is, direct current is made to flow in the field winding. This results in a magnetic field, and when the rotor is made to rotate at a constant speed, the magnetic field rotates with it. Accordingly, as the moving magnetic field passes through the stator winding(s), an EMF is induced therein. If the stationary armature includes, for example, three stationary armature windings, they experience a periodically varying magnetic field, and three EMFs are induced therein. These three EMFs conform a three-phase system of voltages. Thus, for 60-Hz AC systems, in a two-pole machine, the rotor has to rotate at 3600 revolutions per minute with three armature windings displaced equally in space on the stator body to generate three-phase electric power.

As the generator electric load increases, the generator demands more mechanical power from its prime mover and more current flows through the stator winding, and therefore more electric active power is delivered from the synchronous generator to the power system. By increasing the current to the rotor winding, the synchronous generator produces more reactive power, also called reactive volt-amperes (VARs), which, in effect, can raise the power system voltage. Conversely, by decreasing the current in the rotor winding, VARs are absorbed by the generator, effectively lowering the power system voltage. As is known, we express in Watts or Megawatts the active power delivered to or consumed by a load, while VAR or MVAR is the imaginary counterpart of the Watt or Megawatt and represents the reactive power consumed or generated by a reactive load (i.e., a load having a phase difference between the applied voltage and the current).

Generator capability curves ("capability curves") are typically provided by a generator manufacturer to define the operating or thermal limits of a particular synchronous generator at different cooling pressures. Each capability curve represents the synchronous generator capability limit for a pressurized coolant (e.g., hydrogen) circulating to cool the stator and rotor windings. More cooling enables more armature current to flow during synchronous generator operation, while less cooling enables less current to flow. Additionally, over excitation limiter (OEL) curves and minimum excitation limiter (MEL) curves are typically included with the manufacturer-provided capability curves. Steady state stability limit (SSSL) curves may further be determined with generator impedance data and power system parameters.

Because there are limits to the amount of current that can flow through the stator and rotor winding, the operating limits reflected in the capability curves are imposed on the amount of Watts and VARs that the synchronous generator can deliver to the power system. There is also a minimum value of current that must flow in the rotor field to maintain generator stability, and this imposes a limit on the amount of VARs that the synchronous generator can absorb for each delivered active power value. Thus, the operating limits graphically illustrated by the capability curve(s) include an active power component "P" expressed in Megawatts (MW) and a reactive power component "Q" expressed in Mega VARs (MVARs). As long as the P, Q operating point of the synchronous generator (i.e., as long as the amount of Watts and VARs flowing out of or into the generator) is within its safe operating limits, or inside its capability curve, the synchronous generator will operate within safe limits.

Although the operating limits defined by capability curves are utilized by power generating station operators to ensure safe synchronous generator operation, it has been suggested to utilize these curves to influence excitation control of a synchronous generator in real time. For example, U.S. Pat. No. 5,264,778, entitled "Apparatus Protecting a Synchronous Machine from Under Excitation," issued on Nov. 23, 1993, describes a microprocessor based voltage regulator system that provides a minimum limit on excitation that is defined using one or more straight line segments approximating the associated machine capability curves. Such a minimum limit on excitation prevents the excitation of the synchronous generator from falling below a predetermined P-Q characteristic. The microprocessor based voltage regulator system of the U.S. Pat. No. 5,264,778 is included in a control system of the synchronous generator.

It has also been suggested that synchronous generator operation may be improved via use of a visual display that reflects synchronous generator operation with respect to its capability curves. U.S. Pat. No. 5,581,470, entitled "Apparatus for Visually Graphically Displaying the Generator Point of a Generator in Reference to its Capability Curve Including Digital Readouts of Watts, VARs and Hydrogen Pressure," issued on Dec. 3, 1996, describes a computer-based meter that provides a real time graphical display which visually indicates an operating point in relation to a capability curve(s) of a synchronous generator during operation. The operating point(s) and capability curves are defined and displayed based on measurement signals from Watt, VAR and hydrogen pressure transducers.

Synchronous generator outages or failures due to power system faults, abnormal operating conditions, and the like, can be some of the costliest in the power system. Accordingly, protective devices are operatively coupled to the synchronous generators and their outputs in order to measure currents and voltages indicative of synchronous generator operation. Such protective devices are referred to hereinafter as protective relays, and typically include a variety of protective functions or elements.

SUMMARY OF THE INVENTION

According to an embodiment of the invention, a method enables protection for a synchronous generator. The method includes deriving a plurality of generator safe operating boundary data expressions from a plurality of power system data. The power system data may be supplied by a manufacturer of the synchronous generator. The power system data may include generator impedance. The power system data may include power system parameters such as equivalent power system impedance. The generator safe operating boundary data expressions may be used by a protective relay. During operation, the protective relay utilizes at least one of the plurality of generator safe operating boundary data expressions to enable the protection for the synchronous generator. Each of the plurality of generator safe operating boundary data expressions is selected from the group consisting of quadratic equations, circle equations, look-up tables, linear equations and combinations thereof.

The generator safe operating boundary data expressions may be set in relation to a generator capability curve, a steady-state stability limit curve, a minimum excitation limiter curve, or an over excitation limiter curve. It is contemplated that the user may manually set the generator safe operating boundary data expressions (e.g., in relation to a manufacturer provided generator capability curve, by providing generator safe operating boundaries such as the capability curve and user-defined loss-of-field element) or, in some cases, the generator safe operating boundary data expressions may be derived based on generator and/or power system operating limits (e.g., in relation to a steady-state stability limit curve, a minimum excitation limiter curve, or an over excitation limiter curve). In one embodiment, the protective relay determines the generator safe operating boundary data expressions automatically using generator capability curve data, generator impedance data and power system impedance data.

According to another embodiment of the invention, the generator safe operating boundary data expression is set for loss-of-field protection. In one example, a loss-of-field element is provided which is set with respect to the generator capability curve. In another example, a loss-of-field element is provided which is set with respect to an SSSL curve. In another embodiment, one or more active power elements, and/or an undervoltage element may further be provided.

According to another embodiment of the invention, in a protective relay, a method provides protection for a synchronous generator. The method includes selecting at least one of a plurality of generator safe operating boundary data expressions based on a predetermined user programmable input and a generator operating indication. The plurality of generator safe operating boundary data expressions is derived from either an SSSL curve, a plurality of generator safe operating boundaries supplied by a manufacturer of the synchronous generator, or other similar means. The method also includes calculating an active power value sum and a reactive power value sum based on measured three-phase currents and voltages associated with synchronous generator operation. The method further includes comparing the active power value sum and the reactive power value sum to the at least one of the plurality of generator safe operating boundary data expressions, and providing the protection for the synchronous generator based on this comparison.

An apparatus provides protection for a synchronous generator in a power system. The apparatus comprises a means for deriving a plurality of digitized signals representative of measured three-phase secondary currents and voltages associated with synchronous generator operation, and a microcontroller operatively coupled to the means for deriving the plurality of digitized signals. The microcontroller includes a microprocessor and a memory operatively coupled to the microprocessor. The microcontroller is programmed to, based on a plurality of predetermined user programmable inputs and generator operating indications, select at least one of a plurality of generator safe operating boundary data expressions. The plurality of generator safe operating boundary data expressions may be derived from a plurality of generator safe operating boundaries supplied by a manufacturer of the synchronous generator. The plurality of generator safe operating boundary data expressions may be derived from user-defined values such as coordinates of a loss-of-field element. The microcontroller is also programmed to calculate an active power value sum and a reactive power value sum based on the plurality of digitized signals, compare the active power value sum and the reactive power value sum to the at least one of the plurality of generator safe operating boundary data expressions, and provide protection for the synchronous generator based on this comparison.

A computer readable medium having program code recorded thereon provides protection for a synchronous generator in a power system. The computer readable medium includes a first program code for selecting at least one of a plurality of generator safe operating boundary data expressions based on a generator operating indication and a predetermined user programmable input. The plurality of generator safe operating boundary data expressions is derived from a plurality of generator safe operating boundaries supplied by a manufacturer of the synchronous generator. The computer readable medium also includes a second program code for calculating an active power value sum and a reactive power value sum based on measured three-phase currents and voltages associated with synchronous generator operation, a third program code for comparing the active power value sum and reactive power value sum to at least one of the plurality of generator safe operating boundary data expressions, and a fourth program code for providing the protection for the synchronous generator based on the comparison.

It should be understood that the present invention includes a number of different aspects and/or features which may have utility alone and/or in combination with other aspects or features. Accordingly, this summary is not an exhaustive identification of each such aspect or feature that is now or may hereafter be claimed, but represents an overview of certain aspects of the present invention to assist in understanding the more detailed description of preferred embodiments that follow. The scope of the invention is not limited to the specific embodiments described below, but is set forth in the claims now or hereafter filed.

BRIEF DESCRIPTION OF THE DRAWINGS

FIG. 2b is an exemplary functional block of the generator operating boundary function of generator protection relay of FIG. 2a.

FIG. 2c is an exemplary functional block of the generator operating boundary function adapted for providing positive-sequence values of generator protection relay of FIG. 2a.

FIG. 9 is a graphical representation of an estimation curve for the boundary for a stator core temperature associated with the stator end region heating limit of a generator capability curve.

DETAILED DESCRIPTION OF THE PREFERRED EMBODIMENTS

Figure 1:
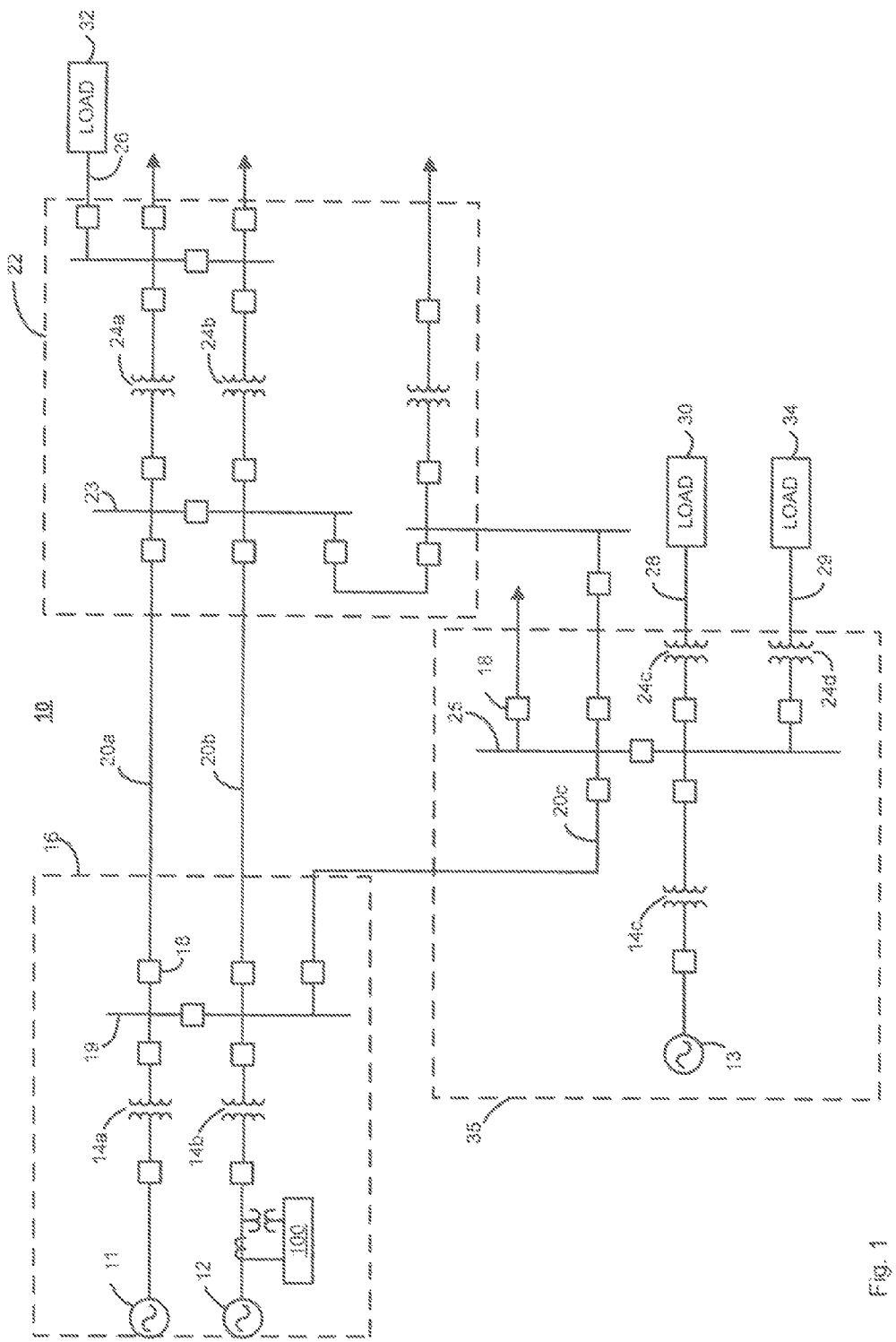
FIG. 1 is a single line schematic of a power system that may be utilized in a typical wide area network.

FIG. 1 is a single line schematic diagram of a power system 10 that may be utilized in a typical wide area system. As illustrated in FIG. 1, the power system 10 includes, among other things, three synchronous generators 11, 12 and 13, configured to generate three-phase voltage sinusoidal waveforms such as 12 kV sinusoidal waveforms, three step-up power transformers 14a, 14b and 14c, configured to increase the generated voltage sinusoidal waveforms to higher voltage sinusoidal waveforms such as 138 kV sinusoidal waveforms and a number of circuit breakers 18. The step-up power transformers 14a, 14b, 14c operate to provide the higher voltage sinusoidal waveforms to a number of long distance transmission lines such as the transmission lines 20a, 20b and 20c. In an embodiment, a first substation 16 may be defined to include the two synchronous generators 11 and 12, the two step-up power transformers 14a and 14b and associated circuit breakers 18, all interconnected via a first bus 19. A second substation 35 may be defined to include the synchronous generator 13, the step-up power transformer 14c and associated circuit breakers 18, all interconnected via a second bus 25. At the end of the long distance transmission lines 20a, 20b, a third substation 22 includes two step-down power transformers 24a and 24b configured to transform the higher voltage sinusoidal waveforms to lower voltage sinusoidal waveforms (e.g., 15 kV) suitable for distribution via one or more distribution lines 26 to loads such as a load 32. The second substation 35 also includes two step-down power transformers 24c and 24d on respective distribution lines 28 and 29 to transform the higher voltage sinusoidal waveforms, received via the second bus 25, to lower voltage sinusoidal waveforms suitable for use by respective loads 30 and 34.

As discussed above, one or more protective relays are operatively coupled to the synchronous generators 11, 12 and 13 to measure currents and voltages indicative of synchronous generator operation. Based on the measured currents and/or voltages, one or more protective elements (e.g., an over-voltage element) of the protective relay may operate to actuate a trip action in the event of an abnormal condition. In the illustrated example of FIG. 1, protection of the generator 12 is provided by a protective relay 100. While not separately shown, it should be understood that additional protective relays 100 may be included in the power system 10.

Figure 2A:
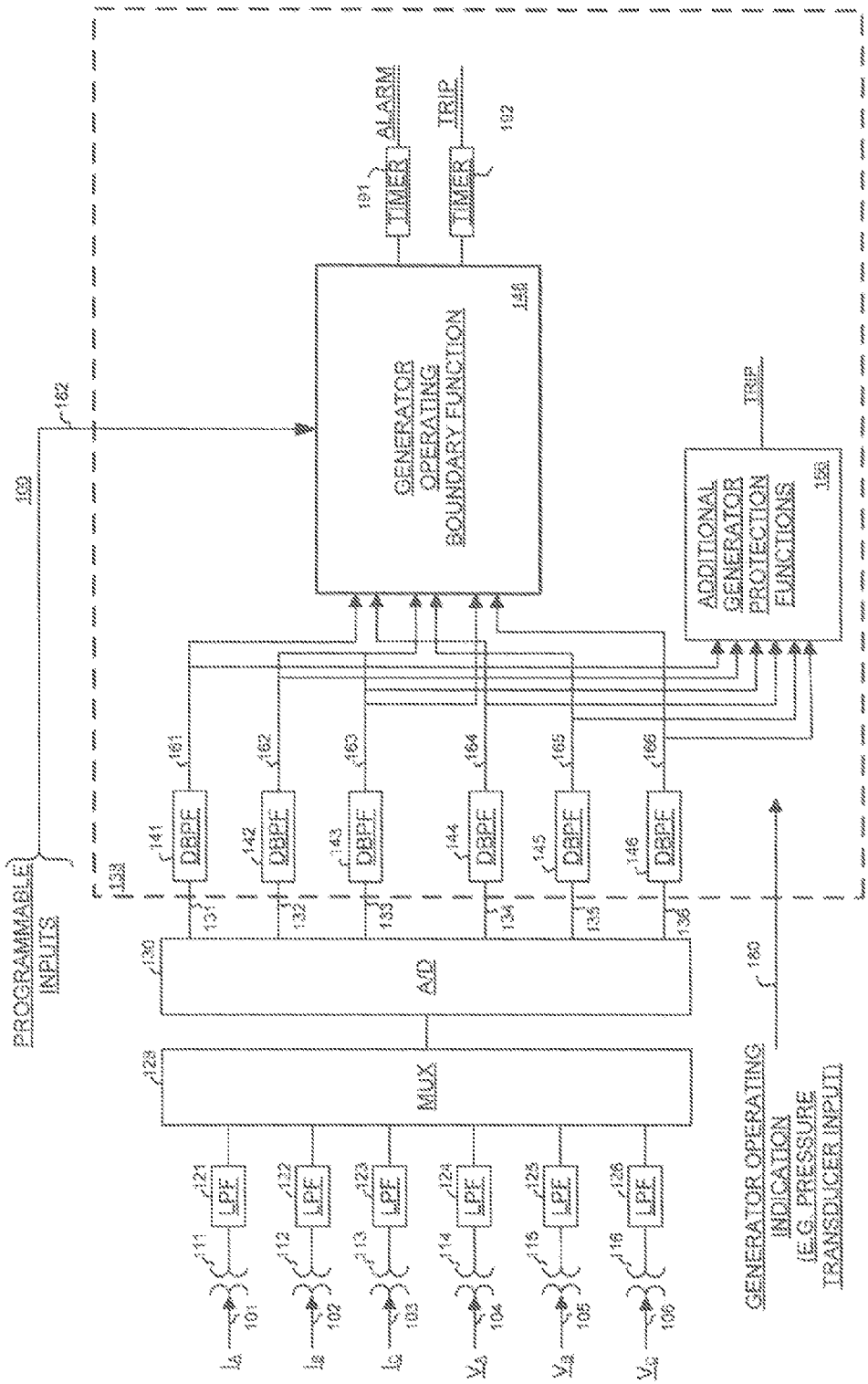
FIG. 2a is an exemplary functional block of a generator protective relay of FIG. 1, according to an embodiment of the invention.

FIG. 2a is an exemplary functional block diagram of the protective relay 100, according to an embodiment of the invention. It should be understood that functional block diagram of FIG. 2a is only one example of a protective relay implementation of the instant invention, and that other implementations are possible.

As illustrated, the protective relay 100 includes a number of inputs 101-106 configured to receive secondary current waveforms $I_A$, $I_B$, and $I_C$ and secondary voltage waveforms $V_A$, $V_B$, and $V_C$ from corresponding voltage and current transformers operatively coupled to each of the A-, B- and C-phases provided by the generator 12. Although illustrated as being received via individual inputs, it should be understood that the secondary current waveforms $I_A$, $I_B$, and $I_C$ and secondary voltage waveforms $V_A$, $V_B$, and $V_C$ may be received via a combination of phase-input current transformers, current transformers, voltage transformers, and non-conventional current and voltage sensors. In general, the secondary current waveforms $I_A$, $I_B$, and $I_C$ and secondary voltage waveforms $V_A$, $V_B$, and $V_C$ are processed to determine whether an alarm and/or trip signal should be issued by the protective relay 100.

More specifically, each of the secondary current and voltage waveforms $I_A$, $I_B$, and $I_C$ and $V_A$, $V_B$, and $V_C$ is further transformed into corresponding scaled sinusoidal waveforms via current transformers 111-113 and voltage transformers 114-116 respectively, and resistors (not separately illustrated). The scaled sinusoidal waveforms are filtered via (hardware) analog low pass filters 121-126. A multiplexer 128 then selects each of the filtered scaled sinusoidal waveforms, one at a time, and provides the selected filtered scaled sinusoidal waveforms to an analog-to-digital (A/D) converter 130. The A/D converter 130 samples and digitizes each of the selected filtered scaled sinusoidal waveforms to form corresponding digitized signals 131-136. The corresponding digitized signals 131-136 are representative of the A-, B- and C-phase secondary current and voltage waveforms $I_A$, $I_B$, and $I_C$ and $V_A$, $V_B$, and $V_C$, respectively.

The corresponding digitized signals 131-136 are received by a microcontroller 138 (or digital signal processor (DSP) or personal computer ((PC))) for signal processing, where they are digitally filtered via, for example, Cosine filters to eliminate DC and unwanted frequency components. In the illustrated example of FIG. 2a, the digital filtering is provided by digital band pass filters (DBPFs) 141-146 where DBPFs 141 and 144 perform digital filtering for digitized signals 131 and 134 to form filtered digital signals 161 and 164 representative of the A-phase secondary current and voltage waveforms $I_A$ and $V_A$, where DBPFs 142 and 145 perform digital filtering for digitized signals 132 and 135 to form filtered digital signals 162 and 165 representative of the B-phase secondary current and voltage waveforms $I_B$ and $V_B$, and where DBPFs 143 and 146 perform digital filtering for digitized signals 133 and 136 to form filtered digital signals 163 and 166 representative of the C-phase secondary current and voltage waveforms $I_C$ and $V_C$. In an embodiment, the filtered digital signals 161-166 are further converted into phasor form to enable subsequent calculations by the microcontroller 138.

An indication input 180 is also provided to receive generator operating indications such as, for example, pressure transducer inputs indicative of generator operating parameters. Other generator indications include cooling pressure, excitation or field current, stator temperature, gearing temperature, ambient temperature and the like.

The microcontroller 138 includes a generator operating boundary function 148, and additional generator protection functions 156 that comprise one or more protective elements. Using the filtered digital signals 161-166 from the DBPFs 141-146, the additional generator protection functions 156 performs one or more typical protection functions. For example, the additional generator protection functions 156 may include a differential protection element, a stator ground fault protection element, a rotor ground fault protection element, a motoring protection element, an over-excitation protection element, a thermal protection element, an under-frequency protection element, an over-current protection element, an over-voltage protection element, and/or an out-of-step protection element. Based on magnitudes and phase angles of the phasors representing the filtered digital signals 161-166, the additional generator protection functions 156 may actuate a trip and/or an alarm indication.

Figure 2B:
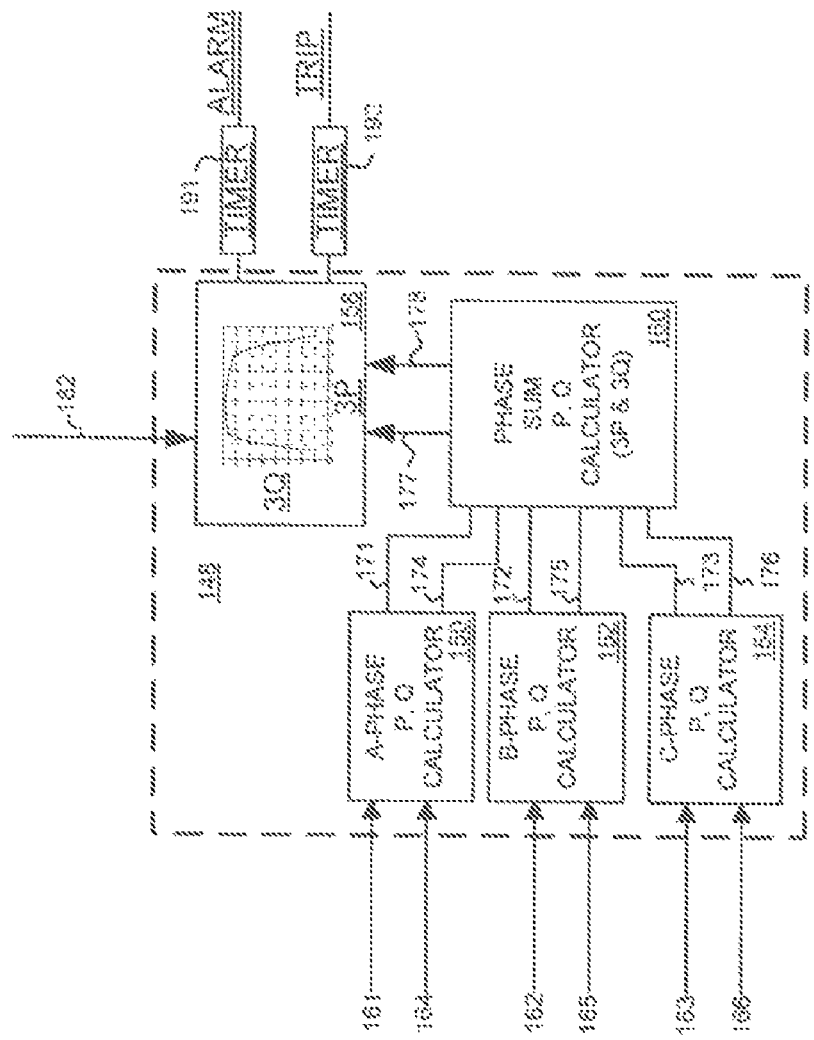

As illustrated in FIG. 2b, the generator operating boundary function 148 includes an A-phase P, Q calculator 150, a B-phase P, Q calculator 152 and a C-phase P, Q calculator 154. Each of the A-phase P, Q calculator 150, the B-phase P, Q calculator 152 and the C-phase P, Q calculator 154 includes two inputs for receiving corresponding filtered digital signals, and at least two outputs. The generator operating boundary function 148 also includes a phase sum P, Q calculator 160 and a curve function 158. The phase sum P, Q calculator 160 is coupled to receive the outputs of the A-phase P, Q calculator 150, the B-phase P, Q calculator 152 and the C-phase P, Q calculator 154. The curve function 158 includes a first (177) and second (178) inputs for receiving outputs from the phase sum P, Q calculator 160, and a third input for receiving user programmable inputs 182. While discussed in terms of P, Q calculators, it should be understood that the generator operating boundary function 148 may be implemented in one of any number of suitable ways, for example, as software executed via operation of the microcontroller 138.

More specifically, the A-phase P, Q calculator 150 includes a first and a second input for receiving the filtered digital signals 161 and 164, and a first and second output for providing an A-phase P value 171 and an A-phase Q value 174, respectively, to the phase sum P, Q calculator 160. During operation, the A-phase P, Q calculator 150 calculates the A-phase P value 171 and the A-phase Q value 174 based on corresponding A-phase secondary current and voltage waveforms $I_A$, $V_A$ 101, 104. The A-phase P value 171 represents a calculated active power operating point of the synchronous generator 12, while the A-phase Q value 174 represents a calculated reactive power operating point of the synchronous generator 12 for the A-phase.

Similarly, the B-phase P, Q calculator 152 includes a first and a second input for receiving the filtered digital signals 162 and 165, and a first and second output for providing a B-phase P value 172 and a B-phase Q value 175, respectively, to the phase sum P, Q calculator 160. During operation, the B-phase P, Q calculator 152 calculates the B-phase P value 172 and the B-phase Q value 175 based on B-phase secondary current and voltage waveforms $I_B$, $V_B$ 102, 105. The B-phase P value 172 represents a calculated active power operating point of the synchronous generator 12 and the B-phase Q value 175 represents a calculated reactive power operating point of the synchronous generator 12 for the B-phase. Likewise, the C-phase P, Q calculator 154 includes a first and a second input for receiving the filtered digital signals 163 and 166, and a first and second output for providing a C-phase P value 173 and a C-phase Q value 176, respectively, to the phase sum P, Q calculator 160. During operation, the C-phase P, Q calculator 154 calculates the C-phase P value 173 and the C-phase Q value 176 based on the C-phase secondary current and voltage waveforms $I_C$, $V_C$ 103, 106. The C-phase P value 173 represents a calculated active power operating point of the synchronous generator 12 and the C-phase Q value 176 represents a calculated reactive power operating point of the synchronous generator 12 for the C-phase.

Each of the A-phase P value 171, the A-phase Q value 174, the B-phase P value 172, the B-phase Q value 175, C-phase P value 173 and the C-phase Q value 176 are received by the phase sum P, Q calculator 160 where the A-phase P value 171, the B-phase P value 172 and the C-phase P value 173 are added together to form a P value sum 177, and the A-phase Q value 174, the B-phase Q value 175 and the C-phase Q value 176 are added to form a Q value sum 178. The P value sum 177 represents a sum of three-phase active power, while the Q value sum 178 represents a sum of three-phase reactive power.

Figure 2C:
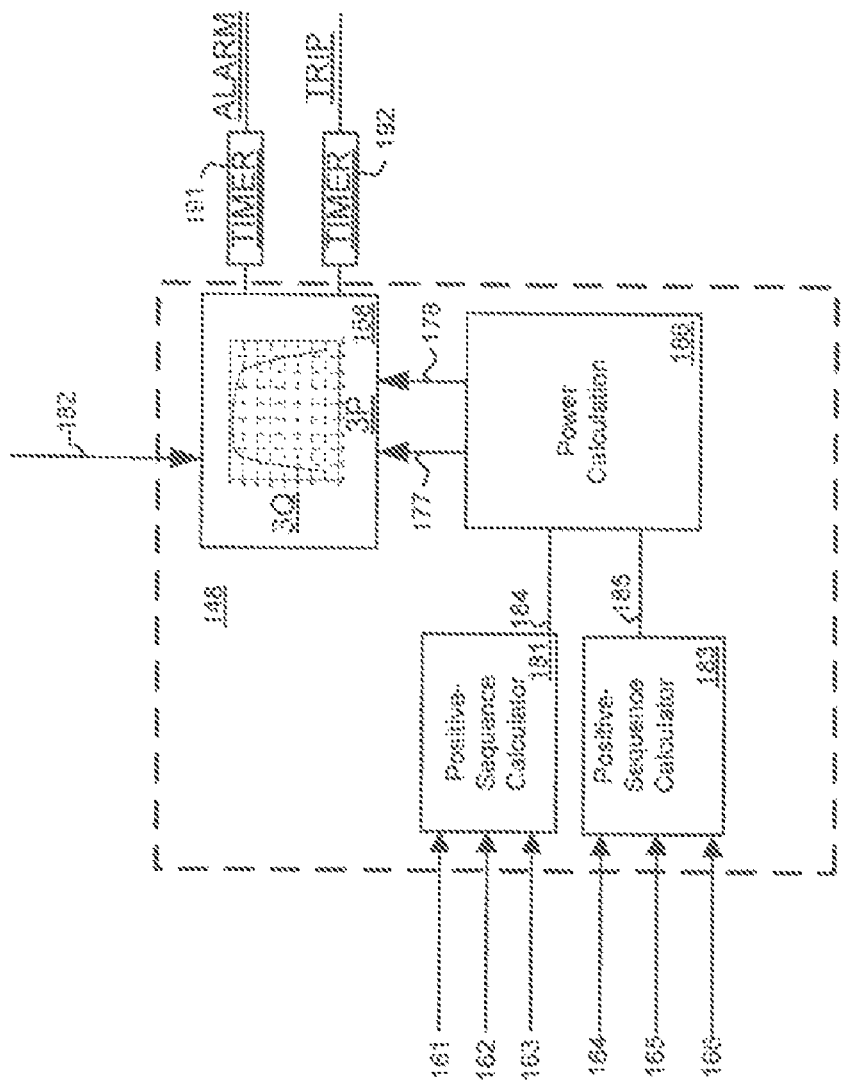

As illustrated in FIG. 2c, positive-sequence calculators 181, 183 may further be included to provide positive-sequence values for power calculation. In this embodiment, the following equations may be utilized therein.

Positive-sequence Voltage (Output 185)

$$V_1 = \frac{V_A + a \cdot V_B + a^2 \cdot V_C}{3} \tag{1}$$

Positive-sequence Current (Output 184)

$$I_1 = \frac{I_A + a \cdot I_B + a^2 \cdot I_C}{3} \tag{2}$$

Positive-sequence Apparent Power $$S_1 = 3 \cdot V_1 \cdot \text{conj}(I_1) \tag{3}$$

Positive-sequence Active Power (Output 177)

$$P_1 = \text{real}(S_1) \tag{4}$$

Positive-sequence Reactive Power (Output 178)

$$Q_1 = \text{imag}(S_1) \quad (5)$$

Where:

$$a := e^{j \cdot 120°} \quad (6)$$

Now referring concurrently to FIGS. 2a and 2b, as discussed above, the curve function 158 includes a first input for receiving the P value sum 177, a second input for receiving the Q value sum 178, and a third input for receiving user programmable inputs 182. The curve function 158 further includes two outputs; a first output for enabling transmission of a binary alarm bit and a second output for enabling transmission of a binary trip bit. This arrangement may further be adapted to include additional outputs for assertion of alarm and/or tripping. For example, additional alarm bits may be included for assertion of alarm conditions associated with the field winding current limit, the armature current limit, the stator end region heating limit, a generator motoring condition, or a loss-of-field condition as will be discussed in further detail below.

In an embodiment, the curve function 158 is mathematically derived from, and is therefore representative of, a manufacturer-provided set of specific capability curves. The curve function 158 may be implemented as at least one set of derived curve expressions (e.g., polynomial equations of the second order; $ax^2 + bx + c = 0$ or otherwise circle equations as discussed in greater detail below), one or more look-up tables, one or more linear equations, or equivalent means, collectively referred to herein as generator safe operating boundary data expressions. Each of the generator safe operating boundary data expressions may be derived from power system data such as manufacturer-provided sets of specific capability curves, SSSL curves, MEL curves, OEL curves or the like, collectively referred to herein as generator safe operating boundaries. As used herein, "power system data" may further include power system parameters such as power system equivalent impedance, power system component impedance, and the like.

Thus, in an embodiment, the apparatus and method for synchronous generator protection of the instant invention utilizes derived curve expressions to perform a portion of the protective functions of the protective relay 100. In another embodiment, the apparatus and method for synchronous generator protection of the instant invention may utilize MEL look-up tables, SSSL linear equations, or any combination of capability curves, SSSL curves MEL curves, and/or OEL curves suitably expressed in the form of quadratic equations, circle equations, look-up tables, linear equations, or equivalent means, to perform protective functions of the protective relay 100.

In one embodiment, the curve function 158 is implemented as a set of three quadratic equations derived from plotted P, Q coordinates of associated manufacturer-provided capability curves. In another embodiment, the curve function 158 is implemented through separate circle equations which provide a graphical representation of an estimation curve for the boundary for field winding heating associated with the field winding current limit of a generator capability curve; the boundary for armature heating associated with the armature current limit of a generator capability curve; and the boundary for stator core temperature associated with the stator end region heating limit. It should be understood however, that other implementations of the capability curves may be used for the curve function 158 (e.g., look-up tables). Further, it is contemplated that the curve function 158 may be derived from P, Q coordinates of SSSL, MEL curves, or OEL curves.

For example, a loss-of-field element characteristic may be provided in relation to an SSSL curve, or the stator end region heating limit curve of the capability curve, as will be discussed in greater detail below.

While illustrated as functional blocks in FIG. 2a, the microcontroller 138 may be implemented via one of any number of suitable means. For example, in an embodiment, the microcontroller 138 may include a CPU, or a microprocessor, a program memory (e.g., a Flash EPROM) and a parameter memory (e.g., an EEPROM). Alternatively, the microcontroller 138 may be implemented as a field programmable gate array (FPGA), a digital signal processor (DSP) or a PC-based platform, to name a few.

Figure 3:
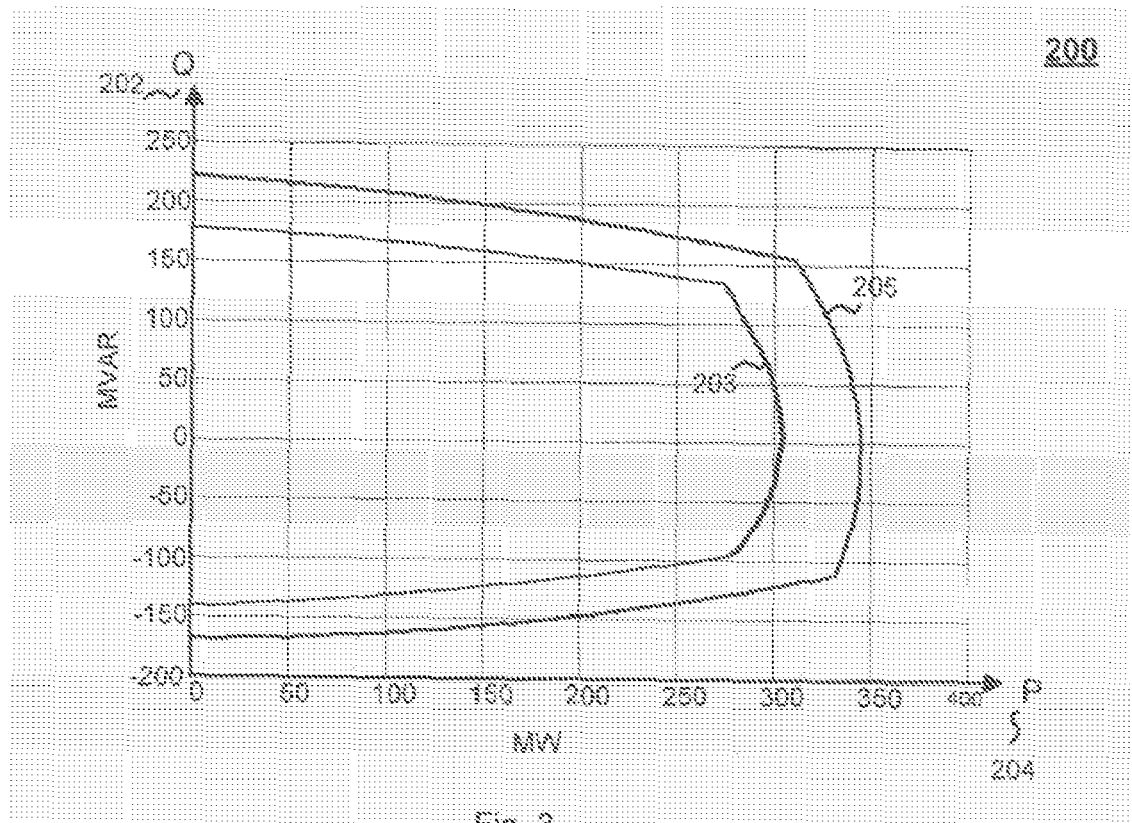
FIG. 3 is an exemplary set of generator capability curves that may be provided by a synchronous generator manufacturer to define the operating limits of a synchronous generator of FIG. 1.

FIG. 3 is an exemplary set of generator capability curves 200 that may be provided by a synchronous generator manufacturer to define the thermal, or heating, operating limits of the synchronous generator 12. In the illustrated example, the set of generator capability curves 200 represent actual capability curves for a 312 MW, 3600 RPM, inner-cooled turbine generator, where the active power component "P" is expressed in MW on the horizontal axis and the reactive power component "Q" is expressed in MVAR on the vertical axis.

An overexcitation region (VARs are being supplied by the synchronous generator 12), defined above the zero MVAR point on the vertical axis, may also be referred to as lagging power factor region. An underexcitation region (VARs are being consumed by the synchronous generator 12), defined below zero MVAR on the vertical axis, may also be referred to as the leading power factor region. The capability curve 205 corresponds to a higher cooling system hydrogen pressure (e.g., 3 kg/cm$^2$) than the capability curve 203 (e.g., 2 kg/cm$^2$). Accordingly, FIG. 3 illustrates that the effectiveness of the cooling and hence the allowable generator loading depends on the cooling pressure, and that the synchronous generator 12 can provide increased power output when the cooling system pressure is increased, provided that the prime mover has the ability to provide the additional power.

Figure 4:
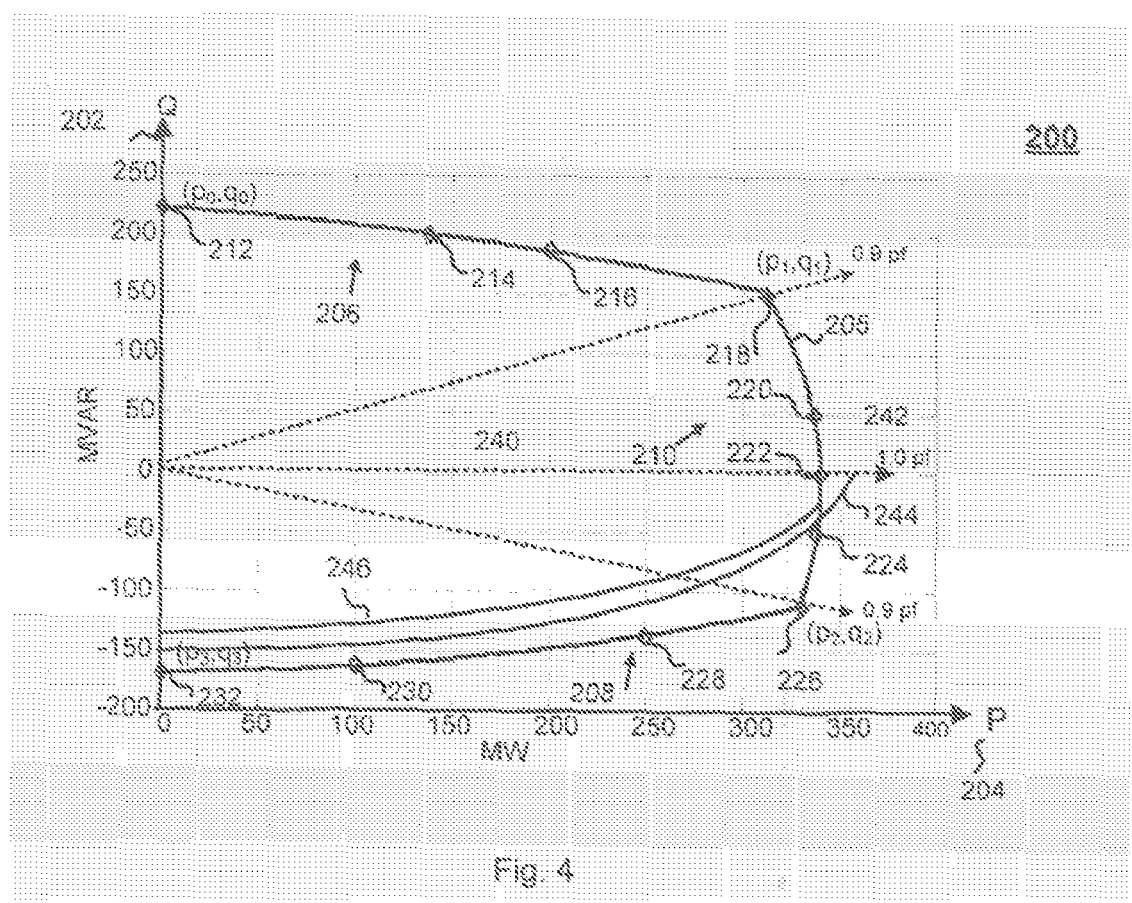
FIG. 4 is one of the capability curves of the exemplary set of generator capability curves of FIG. 3.

For ease of discussion, FIG. 4 is the capability curve 205 of the exemplary set of generator capability curves 200. In general, synchronous generators are rated in terms of maximum MVA output at a specified voltage and power factor (pf) (e.g., 0.85 lagging) which they can carry continuously without overheating. The active power output is limited by the prime mover capability to a value within the MVA rating of the generator. The continuous reactive power output capability is limited by the three factors; an armature current limit, a field winding current limit and an end region heating limit. The armature current limit associated with an RI$^2$ power loss is the maximum current that can be carried by the armature without exceeding heating limitations. The field current limit is associated with an $R_{fd}i_{fd}^2$ power loss. The localized heating in the end region of the stator imposes a third limit on the synchronous generator 12 which affects the capability of the generator in the underexcited condition.

Referring to FIG. 4, for each cooling pressure, a first curve portion 206 of the capability curve 205 represents a boundary for field winding heating associated with the field winding current limit. This is also generally referred to as the rotor current limit. The rotor-current limit on the generator field current generally results from copper power losses in the rotor winding. A second curve portion 210 of the capability curve 205 represents a boundary for armature heating associated with the armature current limit. The armature current limit on the generator field current generally results from stator copper power losses, wherein there is generally a maximum current that a generator can carry continuously without exceeding the allowable operating temperature. A third curve portion 208 of the capability curve 205 represents a boundary for a stator core temperature associated with the stator end region heating limit. This is generally referred to as the stator end heating limit.

An interior region 240 bounded by the first, second and third curve portions 206, 210, 208 is referred to as a safe operation region 240 indicating normal generator operation, while an exterior region 242 outside of the interior region is referred to as an unsafe operation region 242 indicating abnormal generator operation.

Typically, the manufacturer-provided generator capability curves are utilized by a power station operator to determine the operational capability of an associated synchronous generator and to determine whether additional MW can be obtained from the synchronous generator under various conditions. For example, referring to FIG. 4, when operated at a lagging power factor (pf) of 0.9 (point 218), the synchronous generator 12 will generate 312.5 MW of active power and 150 MVAR of reactive power. When operated at a leading pf of 0.9 (point 226), the synchronous generator 12 will generate 330 MW of active power and absorb 112.5 MVAR of reactive power. When operated at a pf of 1.0 (point 222), the synchronous generator 12 will generate a maximum of 345 MW of active power and no MVAR of reactive power.

An SSSL curve 244 and an MEL curve 246 are also illustrated in FIG. 4. The SSSL curve 244 represents a power limit to maintain system stability. The SSSL curve will vary with the synchronous generator and with the power system connected, as well as with voltage.

All synchronous generators connected to the power system operate at the same average speed. The generator speed governors maintain the machine speed close to its nominal value. There is a balance between generated and consumed active power under normal power system operating conditions. Random changes in load and system configuration constantly take place and impose small disturbances to the power system. The property of a power system to keep the normal operating condition under these small slow changes of system loading is generally known as steady-state stability or system stability for small perturbations.

For the two-machine power system the active power transfer $P_e$ is given by:

$$P_e = \frac{E_q E_s}{X_d + X_s} \sin \delta \qquad (7)$$

wherein the generator internal voltage and synchronous reactance are $E_q$ and $X_d$ respectively; the power system voltage and reactance are $E_s$ and $X_s$ respectively; and the system power angle $\delta$ is the angle between $E_q$ and $E_s$.

Referring back to FIG. 4, the center position and radius of the SSSL circle are expressed by the following equations:

$$\text{Center}(P, Q) = 0, \frac{V_t^2}{2}\left(\frac{1}{X_s} - \frac{1}{X_d}\right) \qquad (8)$$

$$\text{Radius} = \frac{V_t^2}{2}\left(\frac{1}{X_d} - \frac{1}{X_s}\right) \qquad (9)$$

Wherein $V_t$ is the generator terminal voltage. Typically when the power system is strong ($X_s$ is low) the SSSL locus is outside the generator capability curve. However, on weak systems, the manual SSSL can be more restrictive than the generator capability in the underexcited region.

Under automatic operation, the automatic voltage regulator (AVR) rapidly varies the field current in response to system operating conditions. This changes the maximum value of the power angle curve upwards or downwards as required by the system. This dynamic response improves the SSSL as compared to that resulting from manual regulator operation. The effect of AVR on SSSL depends on the voltage regulator gain, the regulator time constant and the field time constant.

MEL is a control function included in the automatic voltage regulator that acts to limit reactive power flow into the generator. During normal operation, the AVR keeps generator voltage at a preset value. When system conditions require the generator to absorb reactive power in excess of the MEL set point, the MEL interacts with the AVR to increase terminal voltage until reactive power inflow is reduced below the setting. The MEL curve 246 represents a boundary below which the MEL included in the AVR of the synchronous generator 12 operates to restrict generator reactive power inflow. The MEL curve 246 is situated just above the SSSL curve 244.

Overexcitation limiter (OEL) is a control function included in the AVR that protects the generator from overheating resulting from prolonged field overcurrent. OEL detects the field-overcurrent condition and acts with time delay to ramp down the excitation to a preset value. The OEL operating characteristic (not shown in FIG. 4) plots as a line in the P-Q plane, placed below the field winding current limit curve 206.

The generator safe operating boundary expressions may be derived from generator data and/or power system data (e.g., in relation to the stator end region heating limit boundary 208, MEL curve 246, OEL curve (not shown), or SSSL curve 244). For example, as will be discussed in greater detail below, loss-of-field protection may be provided by situating a generator safe operating boundary expression in relation to the stator end region heating limit boundary 208, or SSSL curve 244.

Referring again to FIG. 2a, the user programmable inputs 182 include pre-programmed user inputs that may be selected/set during commissioning of the protective relay 100. In an embodiment, each of the user programmable inputs 182 corresponds to one of a number of sets of derived curve expressions selectable by the microcontroller 138 upon occurrence of specified generator operating conditions. However, other selection arrangements are contemplated.

As described above, each set of curve expressions is derived from plotted P, Q coordinates of a manufacturer-provided capability curve. For example, one set of curve expressions is derived from the P, Q coordinates of the first, second and third curve portions 206, 208, 210 of the capability curve 205. Similarly, a different set of curve expressions may be derived from the P, Q coordinates of the capability curve 203.

In general, during relay operation, the microcontroller 138 selects a particular set of derived curve expressions for the curve function 158 based on its user programmable input(s) 182, the relay operating conditions determined from the measured secondary currents and voltages, and the generator operating indications received via the indication input 180. As the generator operating conditions change, so do the sets of derived curve expressions utilized by the microcontroller 138 when performing the generator operating boundary function 148. For example, using manufacturer-provided capability curves as a basis, the user may specify, via the user programmable inputs 182, that the microcontroller 138 utilize a first set of derived curve expressions upon detecting a generator operating pressure of 3 Kg/cm$^3$, and utilize a second set of derived curve expressions upon detecting a generator operating pressure of 2 Kg/cm³. Other generator operating conditions such as generator temperature measurements from associated temperature transducers, etc., may be used as a basis for the user programmable inputs 182 and subsequent microcontroller selection of derived curve equation sets.

Although illustrated as including only one user programmable input 182, it is contemplated that the curve function 158 may include more or less user programmable inputs 182, depending on the implementation. Further, although illustrated as one curve, the curve function 158 may include a number of sets of curve expressions derived from multiple manufacturer-provided capability curves, and therefore represent multiple operating limits at different cooling system pressures.

Additionally, one curve function may be assigned to determine an alarm bit output, and another curve function may be assigned to determine a trip bit output. Assertion of an alarm and/or trip output bit may be delayed via operation of one or more timers such as a first timer 191 and a second timer 192. For example, an output of a comparison of the P value sum 177 and the Q value sum 178 to one set of derived curve expressions may actuate an alarm action after a 10 second timeout of the timer 191, while an output of a comparison of the P value sum 177 and the Q value sum 178 to another set of derived curve expressions may actuate a trip action after a 0.2 second timeout of the timer 192.

Thus, during relay operation, in addition to providing protective functions such as differential protection, ground fault protection, etc., illustrated as the additional generator protection functions 156, the microcontroller 138 compares the P value sum 177 and the Q value sum 178 to a selected set(s) of derived curve expressions to determine whether operating conditions of the synchronous generator 12 are inside or outside of the generator safe operating boundaries, and to actuate subsequent alarm and/or trip actions when warranted. Such P and Q value sums 177, 178 reflect the "P, Q operating point" of the synchronous generator 12.

Figure 5A:
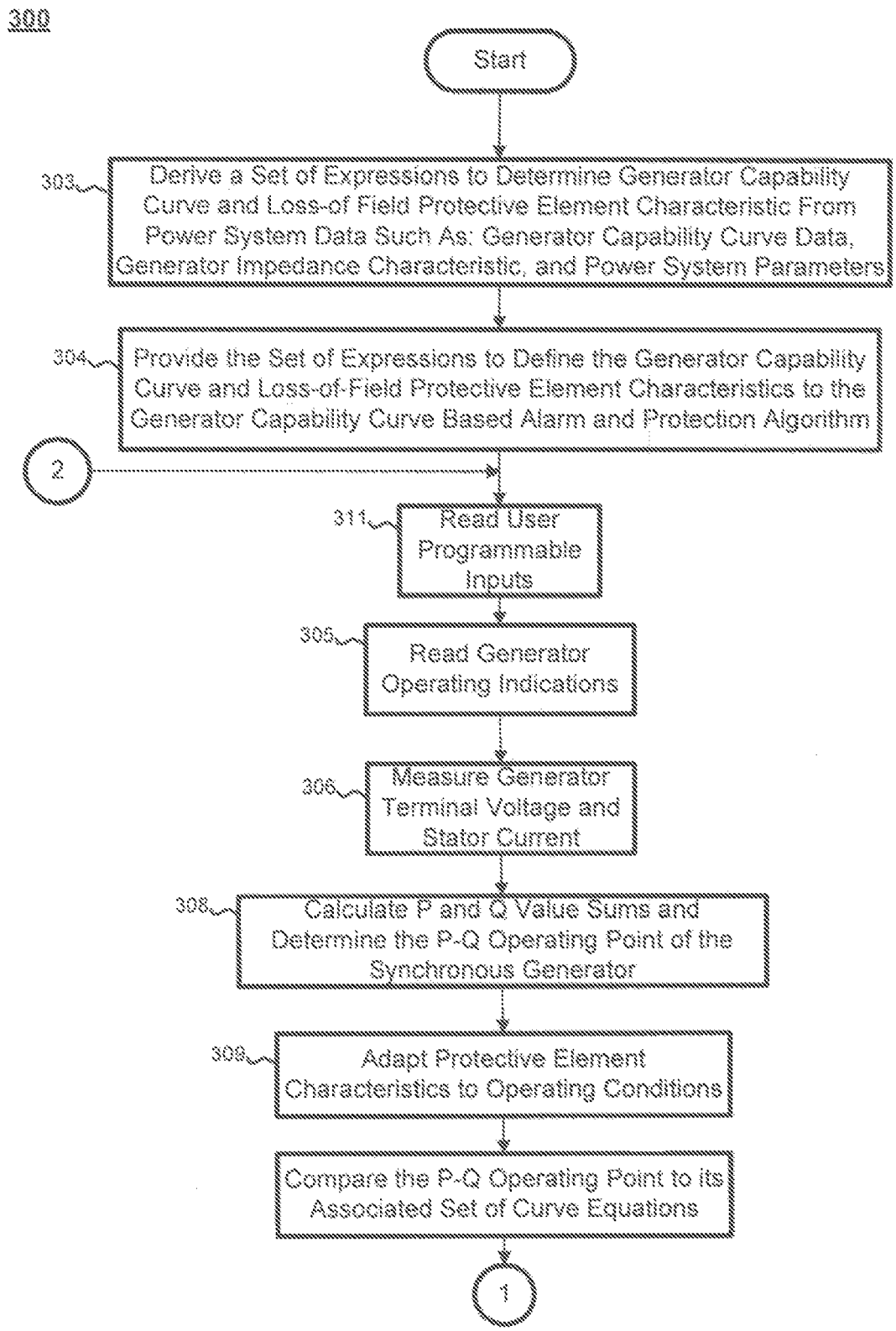
FIG. 5a is a flowchart of a method for synchronous generator protection in the power system of FIG. 1, according to an embodiment of the invention.

FIG. 5a is a flowchart of a method 300 for providing synchronous generator protection in the power system 10, according to an embodiment of the invention. In general, for each manufacturer-provided generator capability curve, the method 300 includes deriving sets of curve expressions or curve elements from any of generator capability curve data, generator impedance characteristic, and/or power system data for use by the protective relay 100 during operation. While implemented as sets of derived curve expressions, it should be understood that the expressions may be linear, quadratic or otherwise circle equations, and that other generator safe operating boundary data expressions (e.g., look-up tables) are contemplated. Other generator safe operating boundaries (e.g., situated in relation to SSSL curves, MEL curves, or OEL curves) may be used as a basis for deriving the generator safe operating boundary data expressions.

The method 300 begins when a number of sets of curve elements or expressions are derived from power system data such as generator capability curve data, generator impedance characteristic, and/or power system parameters (step 303). For example, close approximations of the first, second and third curve portions 206, 210, 208 of the capability curve 205 of FIG. 4 can be expressed as one set of derived curve expressions. The set of derived curve expressions may be calculated using a curve-fitting algorithm such as one available in Matlab® (or similar curve-fitting algorithm) along with a number of plotted (P, Q) coordinates of the capability curve 205.

For example, Table 1 illustrates a number of (P, Q) coordinates of the capability curve 205 that may be used to derive one set of curve expressions.

TABLE 1

| Curve 1 (206) | | Curve 2 (210) | | Curve 3 (208) | |
|---|---|---|---|---|---|
| P (MW) | Q (MVAR) | P (MW) | Q (MVAR) | P (MW) | Q (MVAR) |
| 0 | 212.5 | 312.5 | 150 | 0 | −168 |
| 137.5 | 200 | 343.7 | 50 | 100 | −162.5 |
| 200 | 187.5 | 345 | 0 | 237.5 | −137.5 |
| 312.5 | 150 | 343.7 | −50 | 329.3 | −108.2 |
| | | 329.3 | −108.2 | | |

Where, in FIG. 4:

0 MW and 212.5 MVAR is represented by reference number 212, 137.5 MW and 200 MVAR is represented by reference number 214, 200 MW and 187.5 MVAR is represented by reference number 216, 312.5 MW and 150 MVAR is represented by reference number 218, 343.7 MW and 50 MVAR is represented by reference number 220, 345 MW and 0 MVAR is represented by reference number 222, 343.7 MW and −50 MVAR is represented by reference number 224, 329.3 MW and −108.2 MVAR is represented by reference number 226, 237.5 MW and −137.5 MVAR is represented by reference number 228, 100 MW and −162.5 MVAR is represented by reference number 230, and 0 MW and −168 MVAR is represented by reference number 232.

In one embodiment, using Table 1, a set of three derived curve expressions (10), (11) and (12) approximating the first, second and third curve portions 206, 210, 208 can be derived from the plotted (P, Q) coordinates reflected in Table 1, where the active power component "P" is expressed as a function of the reactive power component "Q". In this embodiment, the curve expressions are in the form of a set of three quadratic equations derived from plotted P, Q coordinates of associated manufacturer-provided capability curves. Each quadratic equation provides a graphical representation of an estimation curve for the boundary for field winding heating associated with the field winding current limit (Curve 1); the boundary for armature heating associated with the armature current limit (Curve 2); and the boundary for a stator core temperature associated with the stator end region heating limit (Curve 3). Other arrangements are possible.

Curve 1 Quadratic Equation:

$$P(Q) = -0.0882 \cdot Q^2 - 19.2898 \cdot Q - 726.1124 \qquad (10)$$

Curve 2 Quadratic Equation:

$$P(Q) = -0.0011 \cdot Q^2 - 0.0234 \cdot Q + 340.1911 \qquad (11)$$

Curve 3 Quadratic Equation:

$$P(Q) = -0.0404 \cdot Q^2 + 10.6301 \cdot Q - 373.5395 \qquad (12)$$

Figure 6:
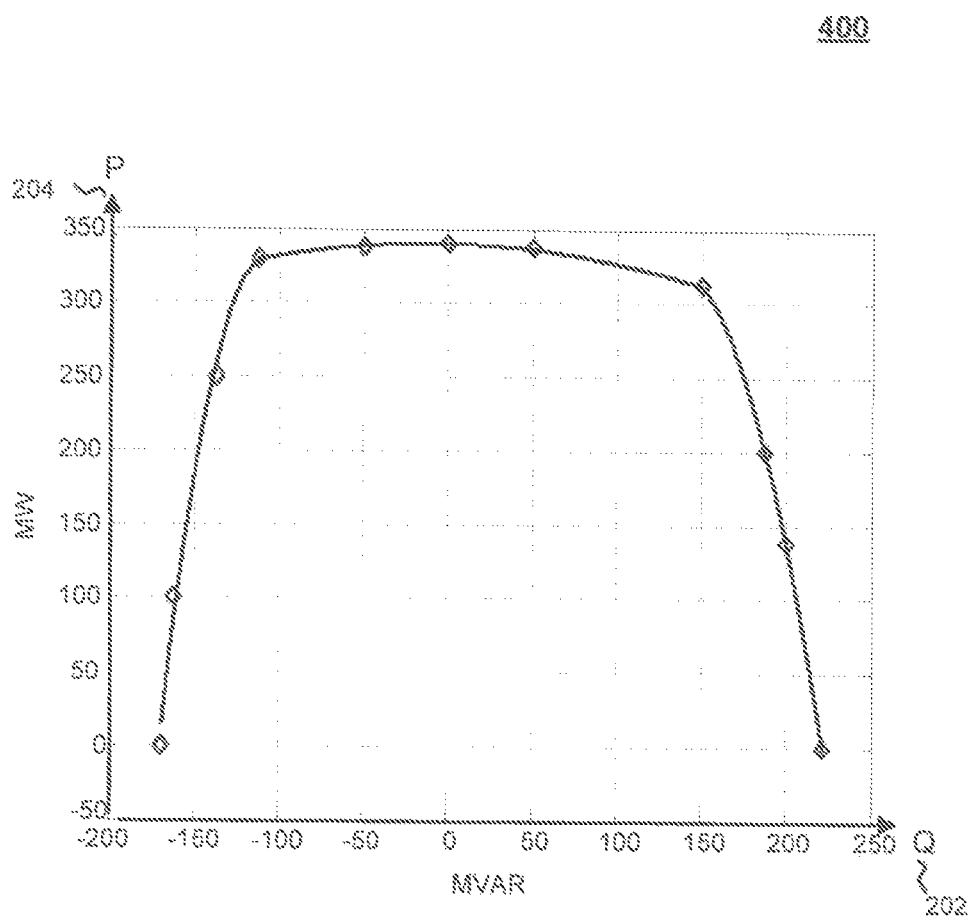
FIG. 6 is a generator capability curve generated based on generator safe operating boundary data expressions derived from the capability curve of FIG. 4 for use by the generator protection relay of FIG. 2a, according to an embodiment of the invention.

FIG. 6 is a generator capability curve 400 drawn based on the set of derived curve expressions defined by equations (10), (11) and (12), according to an embodiment of the invention. For each of the three derived curve expressions of FIG. 6, the active power component is expressed as a function of the reactive power component. Similarly, additional sets of three curve expressions may be derived from other manufacturer-provided capability curves. Each set represents generator operating (thermal) limits at a specific cooling pressure. As discussed above, approximations of the SSSL curves and MEL curves may also be derived in a suitable form, and then used by the protective relay 100 during generator operation.

In another embodiment, a set of three derived curve expressions (13), (17) and (21) approximating the first, second and third curve portions 206, 210, 208 can be derived from the plotted (P, Q) coordinates (e.g., reflected in Table 1), where the active power component "P" is expressed as a function of the reactive power component "Q". In this embodiment, the curve expressions are in the form of a set of three circle equations derived from plotted P, Q coordinates of associated manufacturer-provided capability curves. Each circle equation provides a graphical representation of an estimation curve for the boundary for field winding heating associated with the field winding current limit (Curve 1); the boundary for armature heating associated with the armature current limit (Curve 2); and the boundary for a stator core temperature associated with the stator end region heating limit (Curve 3). Other arrangements are possible.

Figure 7:
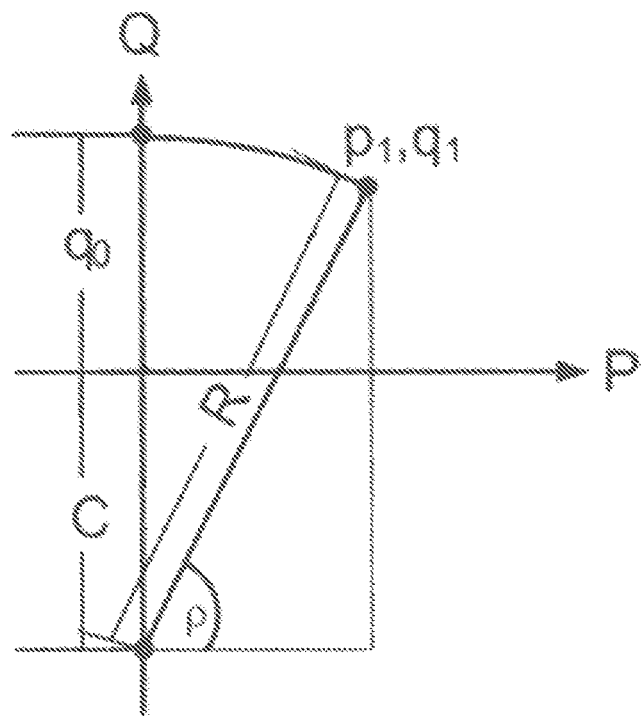
FIG. 7 is a graphical representation of an estimation curve for the boundary for field winding heating associated with the field winding current limit of a generator capability curve.

More specifically, the following circle equation (equation (13)) may provide the graphical representation of the estimation curve for the boundary for field winding heating associated with the field winding current limit (Curve 1) as illustrated in FIG. 7.

Curve 1 Circle Equation for Field Winding Current Limit:

$$S(\beta) = R \cdot e^{i \cdot \beta} + i \cdot C \text{ for } \rho \leq \beta \leq \frac{\pi}{2} \quad (13)$$

Where:
R is the radius of the circle
C is the center of the circle
$\rho$ is the circle lower limit For Curve 1 the following equations (equations (14), (15), and (16)) may be solved in order to obtain the values for R, C, and $\rho$.

$$R \cdot \cos \rho = p_1 \quad (14)$$

$$R \cdot \sin \rho + C = q_1 \quad (15)$$

$$R + C = q_0 \quad (16)$$

Figure 8:
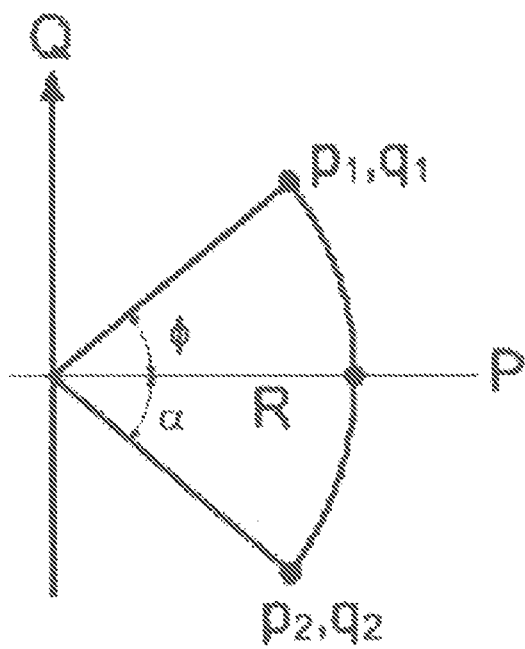
FIG. 8 is a graphical representation of an estimation curve for the boundary for armature heating associated with the armature current limit of a generator capability curve.
Figure 8:
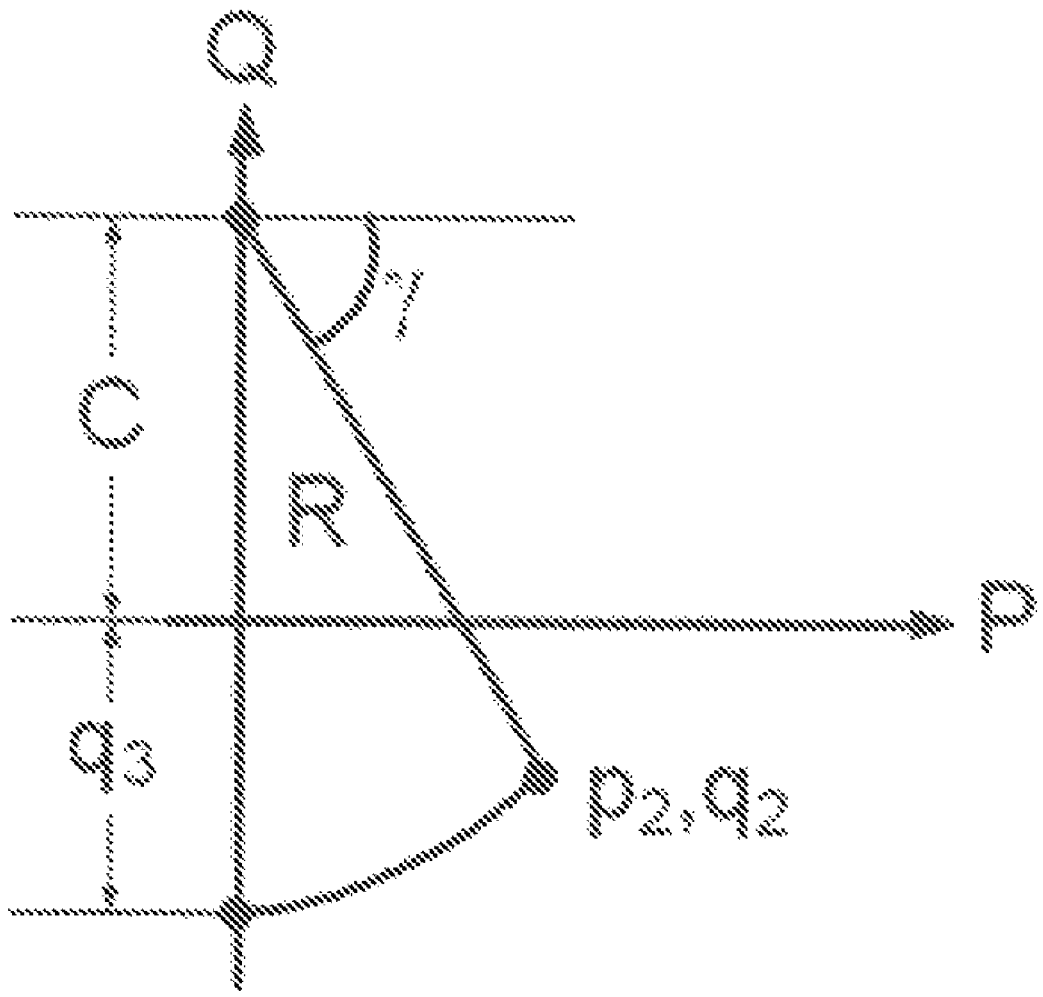

The following circle equation (equation (17)) may provide the graphical representation of the estimation curve for the boundary for armature heating associated with the armature current limit (Curve 2) as illustrated in FIG. 8:

Curve 2 Circle Equation for Armature Current Limit:

$$S(\beta) = R \cdot e^{i \cdot \beta} + i \cdot C \text{ for } -\alpha \leq \beta \leq \phi \quad (17)$$

Where:
R is the radius of the circle
C is the center of the circle
$\phi$ is the circle upper limit that corresponds to the minimum lagging power factor
$-\alpha$ is the circle lower limit that corresponds to the minimum leading power factor For Curve 2 the following equations (equations (18), (19), and (20)) may be solved in order to obtain the values for R, $\alpha$, and $\phi$.

$$R = S_{nom} \quad (18)$$

$$\phi = \cos^{-1}(PF_{Lag}) = \cos^{-1}(P_1/S_{nom}) \quad (19)$$

$$\alpha = \cos^{-1}(PF_{Lead}) = \cos^{-1}(P_2/S_{nom}) \quad (20)$$

Where:
$PF_{Lag}$ is the minimum lagging power factor
$PF_{Lead}$ is the minimum leading power factor
$S_{nom}$ is the generator rated capacity The following circle equation (equation (21)) may provide the graphical representation of the estimation curve for the boundary for a stator core temperature associated with the stator end region heating limit (Curve 3) as illustrated in FIG. 9:

Curve 3 Circle Equation for Stator End Region Heating Limit:

$$S(\beta) = R \cdot e^{i \cdot \beta} + i \cdot C \text{ for } \frac{3}{2} \cdot \pi \leq \beta \leq -\gamma \quad (21)$$

Where:
R is the radius of the circle
C is the center of the circle
$-\gamma$ is the circle upper limit For Curve 3 the following equations (equations (22), (23), and (24)) may be solved in order to obtain the values for R, C, and $\gamma$.

$$R \cdot \cos \gamma = p_2 \quad (22)$$

$$C - R \cdot \sin \gamma = q_2 \quad (23)$$

$$C - R = q_3 \quad (24)$$

Using circle equations (13), (17) and (21), a generator capability curve may be drawn similar to that shown in FIG. 6. As discussed above, approximations of the SSSL curves, MEL curves and OEL curves or user-entered curves may also be derived in a suitable form using circle equation (21). For example and as will be discussed in greater detail below, using the circle equation of Curve 3 (equation (21)), the estimation curve for a loss-of-field protection element curve such that it is situated in relation to the stator end region heating limit curve, or in relation to SSSL may also be derived. In yet another embodiment, the operating region defined in order to provide for loss-of-field protection is located below a loss-of-field element characteristic (situated with respect to the stator end region heating limit curve, or in relation to an SSSL curve), and between two active power elements vertical straight lines.

Figure 10:
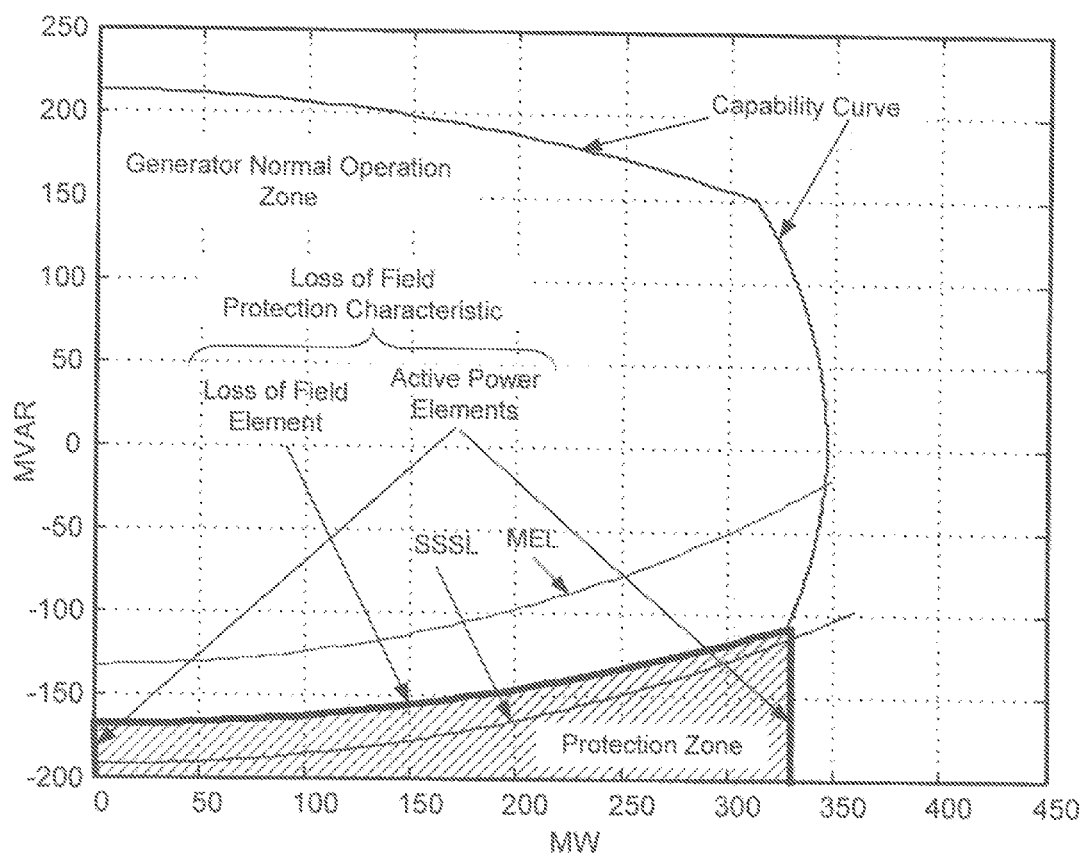
FIG. 10 is a generator capability curve including an arrangement for loss-of-field protection further illustrating the protection zone whereupon a trip signal would be asserted if a condition were to fall therein.

In one embodiment, as shown in the P-Q plane of FIG. 10, a loss-of-field protection characteristic is provided, including a loss-of-field element characteristic and two active power element vertical straight lines. The use of the embodiment of FIG. 10 with the aforementioned apparatuses, systems and methods of the present invention is generally beneficial where the SSSL characteristic is outside the capability curve. In this arrangement, the loss-of-field element characteristic is set coinciding with the stator end heating limit curve, and situated above the SSSL curve. Situating the loss-of-field element in this manner allows the capability curve to protect the generator from stator end core heating. This arrangement further allows using the full generator capability to absorb reactive power, beyond the MEL setting.

Figure 11:
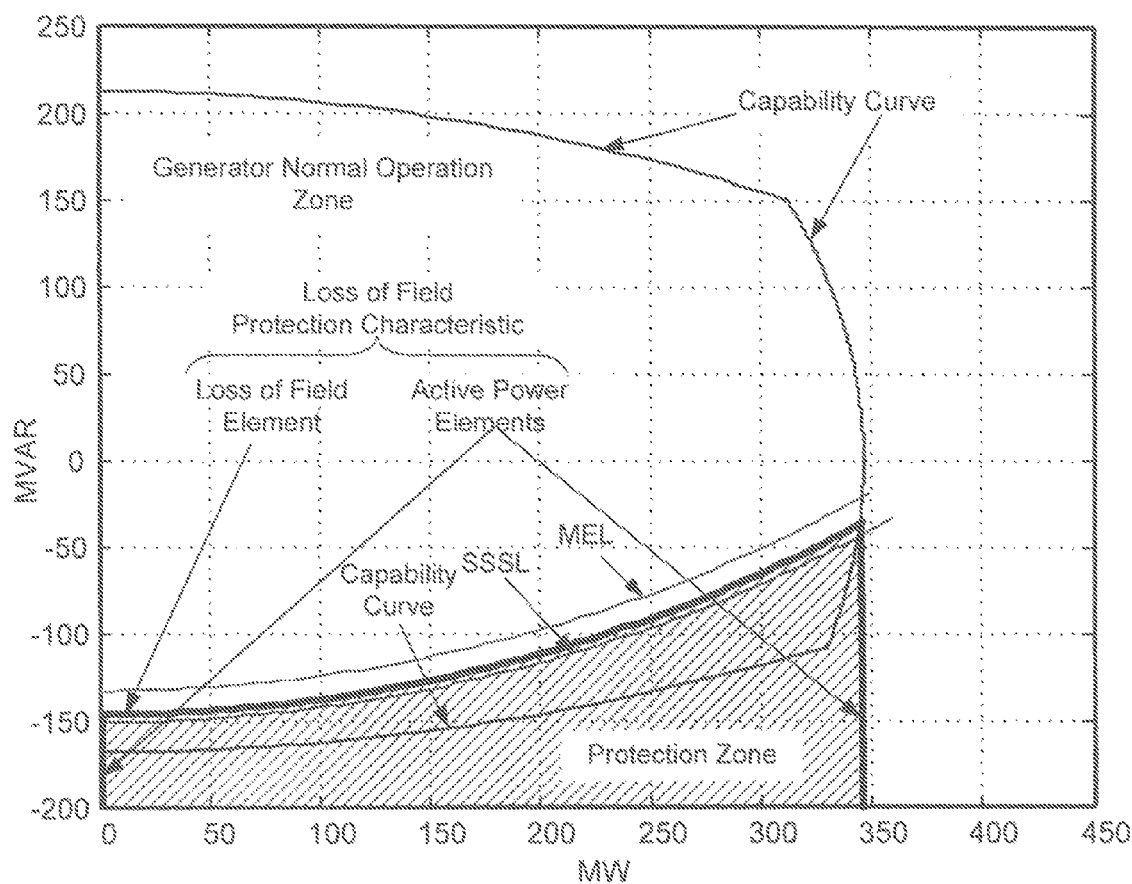
FIG. 11 is another generator capability curve including an arrangement for loss-of-field protection further illustrating the protection zone whereupon a trip signal would be asserted if a condition were to fall therein.

In another embodiment, as shown in the P-Q plane of FIG. 11, another loss-of-field protection characteristic is provided. The use of the embodiment of FIG. 11 with the aforementioned apparatuses, systems and methods of the present invention is generally beneficial where the SSSL characteristic is inside the capability curve, which may occur in weak power systems. In this arrangement, the loss-of-field element characteristic is situated above the SSSL curve, and also inside the capability curve. However, in comparing the P-Q planes of FIGS. 10 and 11, the loss-of-field element of FIG. 11 is situated generally closer to the SSSL curve. Situating the loss-of-field element in this manner limits the amount of reactive power that the generator can absorb.

In the arrangements of FIGS. 10 and 11, the loss-of-field element characteristic along with the capability curve (comprising curves representing a rotor current limit and armature current limit) define a generator normal operation zone, an alarming zone and a protection zone. The area bounded by the loss-of-field element characteristic and the capability curve defines the generator normal operation zone, whereas the area bounded by the two active power elements vertical straight lines and the loss-of-field element characteristic defines the protection zone. It is to be noted that the area outside the area bounded by the loss-of-field element and the capability curve defines an alarming zone as discussed in detail above. As discussed in full detail above, when the generator operating condition falls within the protection zone and/or the alarming zone, the apparatus of FIG. 2a is adapted to assert an alarm and/or trip signal.

The active power elements serve as blinders which restrict coverage along the P axis of the P-Q plane. The left-side active power element may be set to any value. In one embodiment, the left side active power element is set to coincide with the Q axis. The right-side active power element may be set to any value. For example, the right-side active power element may be set such that it adapts to the generator load condition. In another example, the right-side active power element may be set to the measured pre-disturbance active power, plus 20% of the generator rated active power. In yet another example, the upper limit of the right-side active power element may be set to the generator MVA rating or, alternatively the turbine MW rating.

In yet another embodiment, the generator loss-of-field protection element may further include an undervoltage element or curve (not shown). In this arrangement, the undervoltage element operates to accelerate a trip and/or alarm assertion when a low voltage condition indicates that the system may collapse. For example, an undervoltage element may be provided and set to 0.8-0.9 of the generator nominal voltage. Once the generator voltage falls below this value, a trip and/or alarm signal is asserted.

In one embodiment, which may be referred to as the manual method, the techniques described herein relating to deriving a set of expressions to determine the generator capability curve and loss-of-field protective element characteristic may be performed by a protective relay automatically. In this embodiment, the user enters power system data that includes data based on the capability curve and the user-defined loss-of-field element characteristic. For example, the user may enter two coordinates corresponding with the rotor current limit 206 such as $(p_0, q_0)$ 212 and $(p_1, q_1)$ 218 of FIG. 4. For the loss-of-field element, the user may enter coordinates on the user-defined loss-of-field element, and select between a straight-line configuration and a curved-line configuration. The straight-line configuration may include one or more straight-line approximations. Also, the curved-line configuration may include one or more curved-line approximations. For example, the user-defined loss-of-field element may correspond with the stator end heating limit 208 of the capability curve 205, and the user may enter coordinates on this curve such as $(p_3, q_3)$ 232 and $(p_2, q_2)$ 226 of FIG. 4. Alternatively, the user-defined loss-of-field element may lie above the stator end heating limit 208 as illustrated in FIG. 11. From these entered coordinates, the generator safe operating boundary data expressions may be derived by techniques described above from the entered power system data.

In another embodiment, which may be referred to as the automatic method, the user need not enter a user-defined loss-of-field element. However, the user does enter power system data including generator manufacturer data and power system parameters. The generator manufacturer data includes coordinates of points on the capability curve, as described above and in conjunction with FIG. 4 and Table 1, and the generator impedance. The power system parameters includes the equivalent system impedance. From this, the capability curve and the loss-of-field element characteristic are derived automatically, for example, by a protective relay, as further described herein. Thus, the generator safe operating boundary data expressions are derived from a plurality of power system data.

Referring again to FIG. 5a, next a number of sets of derived curve expressions (e.g., quadratic, circle or any other suitable equations) are provided to the protective relay 100 for selection and use by the microcontroller 138 when performing the generator operating boundary function 148 (step 304). In general, during relay operation, the microcontroller 138 determines which set of derived curve expressions should be used as the curve function 158. Such "selected sets of derived curve expressions" may vary depending on previously entered user programmable inputs 182 (step 311), on generator operating indications (step 305), or on generator terminal voltage and/or stator current (step 306). For example, if a generator operating indication is determined to be 2 Kg/cm$^3$, a first set of derived curve expressions derived from a first generator-manufacturer capability curve is used, and if a generator operating indication is determined to be 3 Kg/cm$^3$, a second set of derived curve expressions derived from a second generator-manufacturer capability curve is used. The selected sets of derived curve expressions may also vary depending on the configuration of the generator operating boundary function 148 (e.g., multiple user programmable inputs 182, multiple sets of derived curve expressions used to provide a binary output to actuate an alarm and/or a trip bit, etc.)

Among other things, both secondary voltage and current waveforms $V_A$, $V_B$, $V_C$, $I_A$, $I_B$, and $I_C$ are processed by the protective relay 100 to form the P value sum 177 and the Q value sum 178 as described in connection with FIG. 2a. The P and Q value sums 177 and 178 determine the P, Q operating point of the synchronous generator 12 at a particular moment in time. Generator cooling pressures and the like however, are determined from generator operating indications received via the indication input 180 (see FIG. 2a). In one embodiment, pressure transducers may provide generator cooling gas pressure measurements to the microcontroller 138 via the indication input 180. Other generator operating indications may be used such as, for example, excitation or field current, stator temperature, gearing temperature, ambient temperature and the like. With the user programmable inputs, generator operating indications, and/or generator terminal voltage and/or stator current, the microcontroller 138 calculates the P and Q value sums and determines the P-Q operating point of the synchronous generator. (step 308).

After determining the P-Q operating point, the microcontroller 138 adapts the protective element characteristics of the relay to the generator operating conditions (step 309). The microcontroller 138 compares the P, Q operating point of step 308 to protective element characteristics adapted in step 309 to determine whether the P, Q operating point falls within the safe operation region 240 or the unsafe operation region 242 of a corresponding curve approximated by the selected set of derived curve expressions.

Figure 5B:
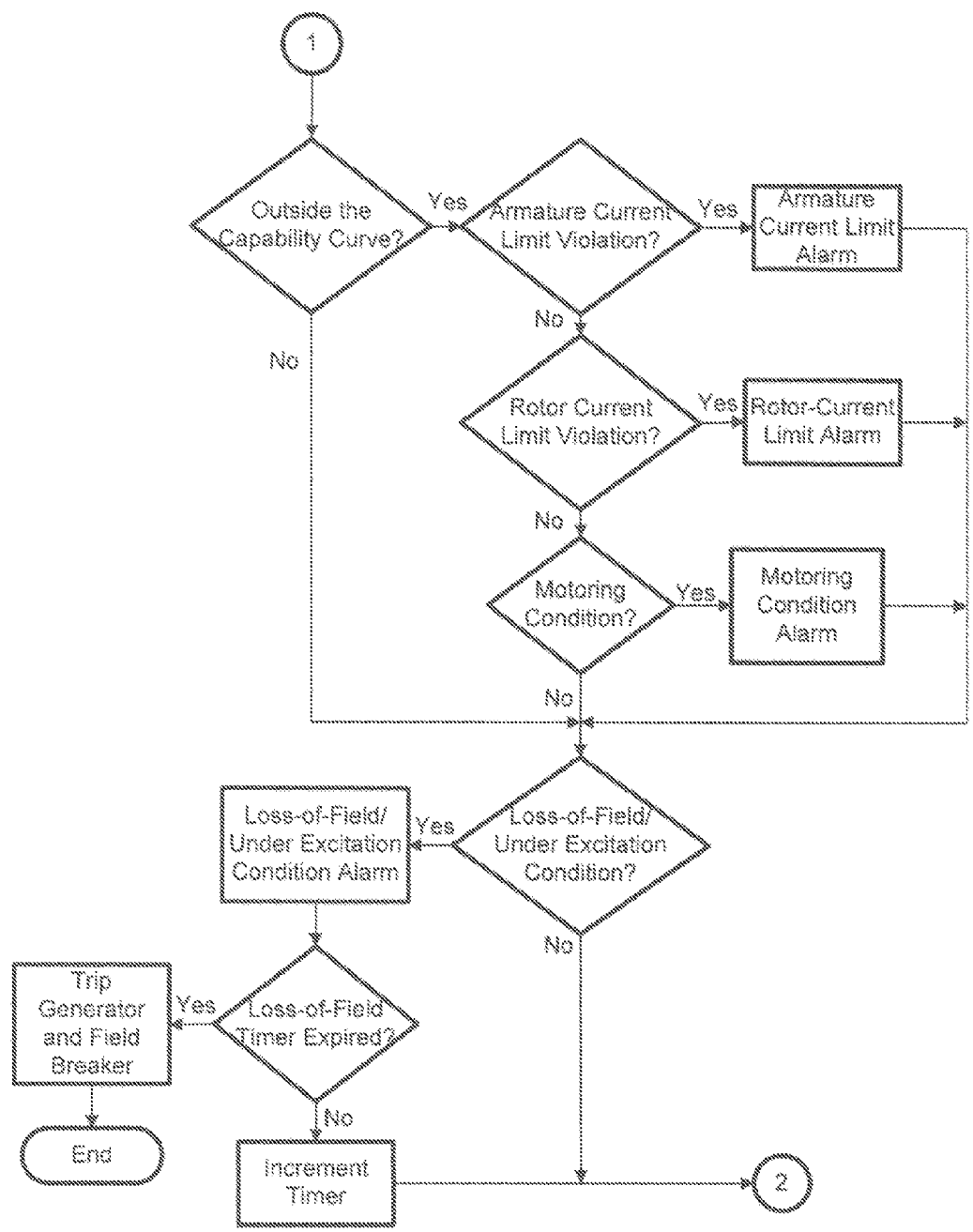
FIG. 5b is a flowchart of a method for asserting either an alarm condition or trip condition for synchronous generator protection in the power system of FIG. 1, according to an embodiment of the invention.

FIG. 5b illustrates an embodiment of a method for determining whether an alarm or trip condition should be asserted. If the P, Q operating point falls within the safe operation region 240 of the curve (e.g., as defined by the selected set of derived curve expressions, etc.), the microcontroller 138 concludes that the synchronous generator 12 is operating within its normal limits (i.e., the normal operating region) and no action is taken.

Figure 12:
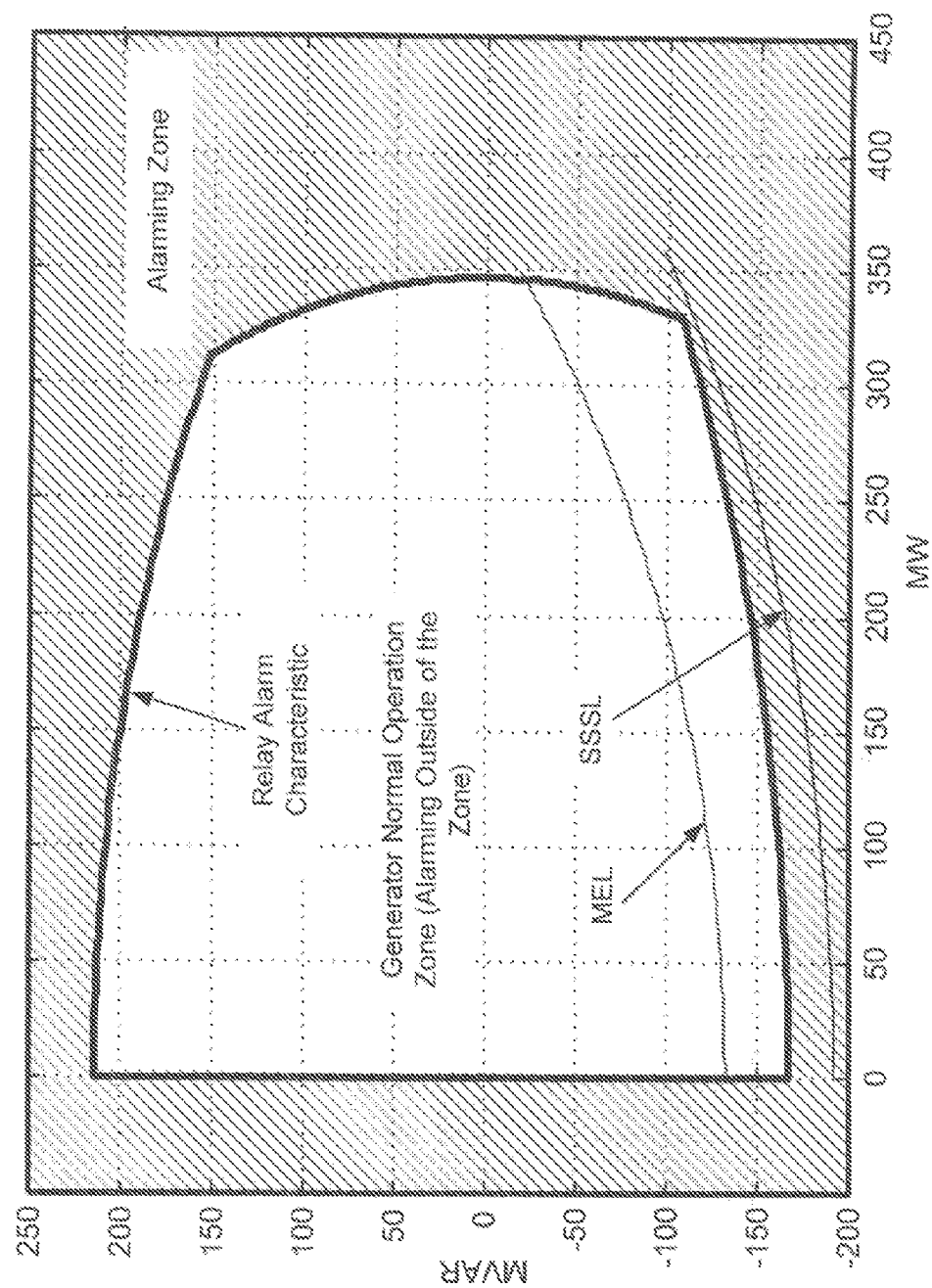
FIG. 12 is a generator capability curve including an arrangement for issuing an alarm signal and showing the alarming zone.

Another example of a generator normal operation zone is further shown as the unshaded region of FIG. 12. An example of a safe operating condition is point $P_A$, $Q_A$ in FIG. 13. It is to be noted that this safe operation region is bounded by the loss-of-field element characteristic along with the capability curve (comprising curves representing a rotor current limit and armature current limit), and it is also bounded by an active power element characteristic, which coincides with the Q axis of the P-Q plane.

Figure 13:
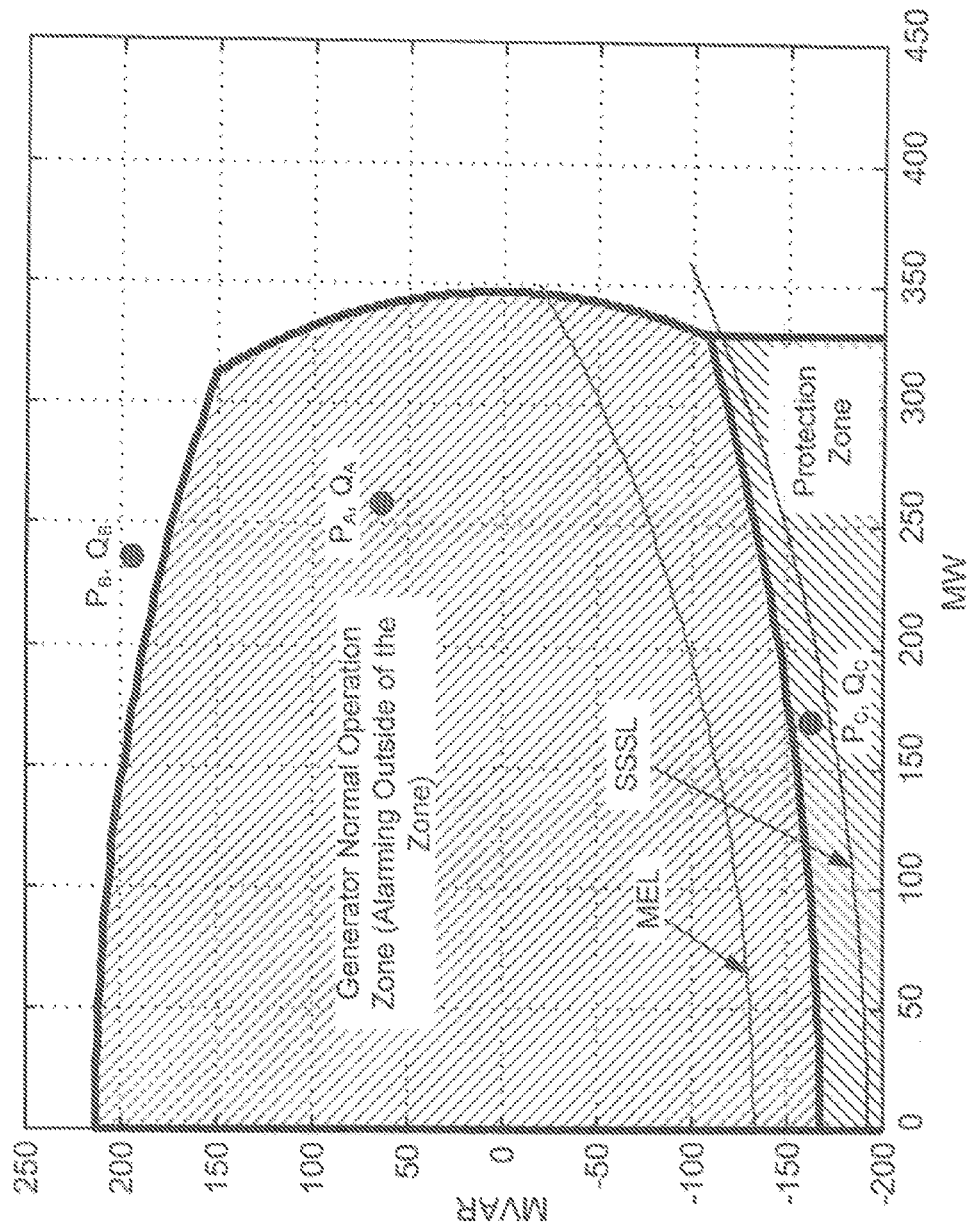
FIG. 13 is a generator capability curve including an arrangement for loss-of-field protection, and an arrangement for issuing an alarm signal, and also showing the generator normal operation zone, the protection zone, and the alarming zone.

Referring back to FIG. 5 b, if the P, Q operating point is determined to fall within the unsafe operation region 242 (e.g., as defined by the selected set of derived curve expressions, etc.), the microcontroller 138 concludes that the synchronous generator 12 is not operating within its safe limits and causes an action. Another example of an alarming zone is further shown as the shaded region of FIG. 12, which corresponds to an armature current limit violation, a rotor current limit violation, a motoring condition, a loss-of-field condition or otherwise an under excitation condition. FIG. 13 further illustrates the protection zone based on a loss-of-field element, wherein a trip signal is asserted if an operating condition would fall therein.

In the case of abnormal generator operation, the action may include actuating an audible alarm to indicate the unsafe operating conditions, actuating a trip signal to remove the synchronous generator 12 from service, notifying the power station operator via a mobile text message or a computer terminal display message, etc. Other notification or remedial actions are contemplated.

More specifically, in one example, the alarm characteristic in the P-Q plane may be formed by the upper and right side branches of the capability curve, by the loss-of-field element characteristic, and by an active-power characteristic that coincides with the Q axis. In one arrangement, the SSSL characteristic may be situated outside the capability curve. Accordingly, as shown in FIG. 12 and similar to FIG. 10, the alarm characteristic fully coincides with the generator capability curve. Depending on the limit violated by the generator operating point (P, Q), the alarm element issues one of the following alarms, Armature-Current Limit Violation; Rotor-Current Limit Violation; Loss-of-field/Underexcitation Condition or Motoring Condition In yet another embodiment, when the SSSL characteristic may be situated inside the capability curve, as shown in FIG. 11, the lower side of the alarm characteristic lies inside the capability curve, coinciding with the loss-of-field element characteristic. Depending on the limit violated by the generator operating point (P, Q), the alarm element issues one of the following alarms, Armature-Current Limit Violation; Rotor-Current Limit Violation; Loss-of-field/Underexcitation Condition or Motoring Condition.

FIG. 13 illustrates yet another embodiment, comprising both a loss-of-field protection characteristic and a capability curve violation alarming characteristic. In this embodiment, an alarm signal is asserted if an operating condition would fall out of the "generator normal operation zone". Additionally, a trip signal is asserted after a time delay if an operating condition would fall within the "relay protection zone".

For example, referring concurrently to FIGS. 5b, 12 and 13, if there is an armature current limit violation, a rotor current limit violation, a motoring condition, a loss-of-field condition or otherwise an under excitation condition, an alarm is asserted (for example, a rotor current limit violation is shown as point ($P_B$, $Q_B$) of FIG. 13). Additionally, referring concurrently to FIGS. 5b and 13, if there is a loss-of-field condition or otherwise an under excitation condition, a trip signal may also be asserted to trip the associated generator and/or field breaker (e.g., shown as point ($P_C$, $Q_C$) of FIG. 13).

The present method may be implemented as a computer process, a computing system or as an article of manufacture such as a computer program product or computer readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

In one embodiment, the logical operations of the present method are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by persons skilled in the art that these operations, structural devices, acts and modules may be implemented in software, in firmware, in special purpose digital logic, and any combination thereof without deviating from the spirit and scope of the present invention as recited within the claims attached hereto.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. An apparatus for providing protection for a synchronous generator having a capability curve and a steady state stability limit (SSSL) curve associated therewith, said generator capability curve comprising a field winding current limit curve, an armature current limit curve and a stator end region heating limit curve, the apparatus comprising:

a microcontroller receiving phase currents and voltages from the synchronous generator, said microcontroller including a P, Q calculator which calculates three-phase active power (P) and three-phase reactive power (Q) values using the phase currents and phase voltages associated with the synchronous generator, said three-phase active power (P) and three-phase reactive power (Q) values defining the P, Q operating point of the synchronous generator on a P, Q plane; and a calculator of a generator protection zone on the P, Q plane, said generator protection zone being defined by two active power elements and a loss-of-field element, said loss-of-field element being defined by the stator end region heating limit curve when the SSSL curve is situated outside the capability curve, said loss-of-field element being defined by the SSSL curve when the SSSL curve is situated inside the capability curve, said calculator of the generator protection zone further determining whether the three-phase active power (P) and the three-phase reactive power (Q) values are within the generator protection zone, wherein if the three-phase active power (P) and the three-phase reactive power (Q) values are within the generator protection zone, said microcontroller asserting a protection signal to remove the synchronous generator from service or trip a field breaker associated with the synchronous generator.

2. The apparatus of claim 1, wherein the generator protection zone is further calculated in relation to at least one selected from the group consisting of a minimum excitation limiter (MEL) curve, an over excitation limiter (OEL) curve, and combinations thereof.

3. The apparatus of claim 1, wherein the generator protection zone is calculated in relation to at least one selected from the group consisting of: a boundary for field winding heating associated with a field winding current limit, a boundary for armature heating associated with an armature current limit, a boundary for stator core temperature associated with a stator end region heating limit, and combinations thereof.

4. The apparatus of claim 3, wherein the boundary for field winding heating associated with a field winding current limit is defined by the following expression:

$$S(\beta) = R \cdot e^{i\beta} + i \cdot C \text{ for } \rho \leq \beta \leq \frac{\pi}{2}$$

Where:
R is the radius of the circle
C is the center of the circle
$\rho$ is the circle lower limit.

5. The apparatus of claim 3, wherein the boundary for armature heating associated with an armature current limit is defined by the following expression:

$$S(\beta) = R \cdot e^{i\beta} + i \cdot C \text{ for } -\alpha \leq \beta \leq \phi$$

Where:
R is the radius of the circle
C is the center of the circle
$\phi$ is the circle upper limit that corresponds to the minimum lagging power factor
$-\alpha$ is the circle lower limit that corresponds to the minimum leading power factor.

6. The apparatus of claim 3, wherein the boundary for stator core temperature associated with a stator end region heating limit is defined by the following expression:

$$S(\beta) = R \cdot e^{i\beta} + i \cdot C \text{ for } \frac{3}{2} \cdot \pi \leq \beta \leq -\gamma$$

Where:
R is the radius of the circle
C is the center of the circle
$-\gamma$ is the circle upper limit.

7. The apparatus of claim 1, further including an undervoltage element.

8. The apparatus of claim 7, wherein the undervoltage element accelerates the protection signal assertion when a low voltage condition indicates that the power system may collapse.

9. The apparatus of claim 1, wherein one of the active power elements is adaptable to the load condition of the generator.

10. The apparatus of claim 1, wherein the calculator of generator protection zone is further adapted to determine whether the three-phase active power (P) and the three-phase reactive power (Q) values are within a generator safe operating boundary.

11. The apparatus of claim 1, wherein the calculator of generator protection zone is further adapted to determine whether the three-phase active power (P) and the three-phase reactive power (Q) values are within a generator alarm zone, wherein if the three-phase active power (P) and the three-phase reactive power (Q) values are within the generator alarm zone, said calculator of generator protection zone is adapted to assert an alarm signal.

12. The apparatus of claim 1, wherein the protection signal is a trip signal.

13. The apparatus of claim 10, wherein the generator safe operating boundary is calculated in relation to at least one selected from the group consisting of: a generator capability curve, a boundary for field winding heating associated with a field winding current limit, a boundary for armature heating associated with an armature current limit, a boundary for stator core temperature associated with a stator end region heating limit, a steady-state stability limit (SSSL) curve, a minimum excitation limiter (MEL) curve, an over excitation limiter (OEL) curve, and combinations thereof.

14. The apparatus of claim 11, wherein the generator alarm zone is calculated in relation to at least one selected from the group consisting of: a generator capability curve, a boundary for field winding heating associated with a field winding current limit, a boundary for armature heating associated with an armature current limit, a boundary for stator core temperature associated with a stator end region heating limit, a steady-state stability limit (SSSL) curve, a minimum excitation limiter (MEL) curve, an over excitation limiter (OEL) curve, and combinations thereof.

15. An apparatus for providing protection for a synchronous generator having a capability curve, a steady state stability limit (SSSL) curve, and a rated active power associated therewith, said generator capability curve comprising a field winding current limit curve, an armature current limit curve and a stator end region heating limit curve, the apparatus comprising:
 a microcontroller receiving phase currents and voltages from the synchronous generator, said microcontroller including
 a P, Q calculator which calculates three-phase active power (P) and three-phase reactive power (Q) values using the phase currents and phase voltages associated with the synchronous generator, said three-phase active power (P) and three-phase reactive power (Q) values defining the P, Q operating point of the synchronous generator on a P, Q plane; and
 a calculator of a generator protection zone on the P, Q plane, said generator protection zone being defined by two active power elements and a loss-of-field element, wherein one of the active power elements is adaptable, said loss-of-field element being defined by the stator end region heating limit curve when the SSSL curve is situated outside the capability curve, said loss-of-field element being defined by the SSSL curve when the SSSL curve is situated inside the capability curve, said calculator of the generator protection zone further determining whether the three-phase active power (P) and the three-phase reactive power (Q) values are within the generator protection zone, wherein if the three-phase active power (P) and the three-phase reactive power (Q) values are within the generator protection zone, said microcontroller asserting a protection signal to remove the synchronous generator from service or trip a field breaker associated with the synchronous generator.

16. The apparatus of claim 15 wherein the adaptable active power element has a setting equal to the active power calculated by the P, Q calculator in addition to a select percentage of the rated active power associated with the synchronous generator.

\* \* \* \* \*